United States Patent
Yang et al.

(10) Patent No.: US 7,492,387 B2
(45) Date of Patent: Feb. 17, 2009

(54) IMPLEMENTATION OF MPCP MCU TECHNOLOGY FOR THE H.264 VIDEO STANDARD

(76) Inventors: Chih-Lung Yang, 6th Fl. No. 46, Tai Ho Middle Street, Chunghua 50068 (TW); Lars Chapsky, 1913 Meridian Ave., South Pasadena, CA (US) 91030

(*) Notice: Subject to any disclaimer, the term of this patent is extended or adjusted under 35 U.S.C. 154(b) by 769 days.

(21) Appl. No.: 11/155,271

(22) Filed: Jun. 17, 2005

(65) Prior Publication Data

US 2005/0231588 A1 Oct. 20, 2005

Related U.S. Application Data

(63) Continuation-in-part of application No. 11/071,147, filed on Mar. 3, 2005, which is a continuation-in-part of application No. 10/212,831, filed on Aug. 5, 2002, now abandoned.

(60) Provisional application No. 60/581,153, filed on Jun. 18, 2004.

(51) Int. Cl.
  *H04N 7/14* (2006.01)
  *H04B 1/66* (2006.01)

(52) U.S. Cl. ............... 348/14.09; 348/14.08; 348/14.13

(58) Field of Classification Search ... 348/14.01–14.16; 375/240.13, 240.01; 370/260, 261; 709/204
See application file for complete search history.

(56) References Cited

U.S. PATENT DOCUMENTS 5,003,532 A 3/1991 Ashida et al.

(Continued)

FOREIGN PATENT DOCUMENTS

EP 0523299 1/1993

(Continued)

OTHER PUBLICATIONS

Da-Jin Shiu et al., "A DCT-Domain H.263 Based Video Combiner For Multipoint Continuous Presence Video Conferencing", Multimedia Computing and Systems, 1999, IEEE International Conference on Florence, Italy Jun. 7-11, 1999, Los Alamitos, CA, USA, IEEE Comput. Soc., US Jun. 7, 1999, pp. 77-81, XP010519359 ISBN: 0-7695-0253-9.

(Continued)

*Primary Examiner*—Melur Ramakrishnaiah
(74) *Attorney, Agent, or Firm*—Christopher P. Maiorana

(57) ABSTRACT

A method for generating a video output signal. The method may include receiving a plurality of input video signals from each of the participants. Each of the input video signals may have a plurality of input frames. Each of the input frames may have a source slice carrying an image. Each of the input frames may be encoded using the respective reference frame at an encoding time. The method may include a step for generating the video output signal for transmission to the participants. The video output signal may comprise a plurality of output frames. A first of the output frames generally has at least a first slice having (a) a first coded portion carrying the image from a first of the participants and (b) a first unencoded portion for the image from a second of the participants. A second of the output frames generally has at least a second slice having (a) a second coded portion carrying the image from the second participant and (b) a second unencoded portion for the image from the first participant. The frames of the video output signal are generated as soon as one of the frames of the video input signal are received.

20 Claims, 21 Drawing Sheets

U.S. PATENT DOCUMENTS

| | | | |
|---|---|---|---|
| 5,440,683 A | 8/1995 | Nally et al. | |
| 5,453,780 A | 9/1995 | Chen et al. | 348/14.11 |
| 5,548,324 A | 8/1996 | Downs et al. | |
| 5,671,377 A | 9/1997 | Bleidt et al. | |
| 5,691,768 A | 11/1997 | Civanlar et al. | |
| 5,764,277 A | 6/1998 | Loui et al. | 348/14.01 |
| 5,903,563 A | 5/1999 | Rashid et al. | |
| 5,963,547 A | 10/1999 | O'Neil et al. | 370/260 |
| 6,128,649 A | 10/2000 | Smith et al. | |
| 6,141,062 A | 10/2000 | Hall et al. | |
| 6,147,695 A | 11/2000 | Bowen et al. | |
| 6,195,116 B1 | 2/2001 | Lee | |
| 6,198,500 B1 | 3/2001 | Watanabe et al. | |
| 6,285,661 B1 | 9/2001 | Zhu et al. | 370/260 |
| 6,288,740 B1 | 9/2001 | Lai et al. | 348/14.09 |
| 6,300,973 B1 | 10/2001 | Feder et al. | 348/14.09 |
| 6,441,841 B1 * | 8/2002 | Tanoi | 348/14.07 |
| 6,584,077 B1 | 6/2003 | Polomski | 370/263 |
| 6,606,112 B1 | 8/2003 | Falco | 348/14.12 |
| 2001/0019354 A1 * | 9/2001 | Einarsson et al. | 348/14.09 |
| 2005/0008240 A1 * | 1/2005 | Banerji et al. | 382/238 |

FOREIGN PATENT DOCUMENTS

| | | |
|---|---|---|
| EP | 11041756 | 10/2000 |
| WO | WO99/35660 | 7/1999 |
| WO | WO00/13147 | 3/2000 |
| WO | WO00/74373 | 12/2000 |
| WO | WO01/22735 | 3/2001 |

OTHER PUBLICATIONS

Sun, M-T et al., "A Coded-Domain Video Combiner For Multipoint Continuous Presence Video Conference", IEEE Transactions on Circuits and Systems For Video Technology, IEEE Inc., New York, US, vol. 7, No. 6, Dec. 1, 1997, pp. 855-863, XP000729341 ISSN: 1051-8215.

Shaw-Min Lei et al., "Video Bridging Based on H.261 Standard", IEEE Transactions on Circuits and Systems for Video Technology, vol. 4, No. 4, Aug. 1994, IEEE Inc. New York, US, pp. 425-436, XP000464656.

Chia-Wen Lin et al., "Dynamic Rate Control in Multipoint Video Transcoding", IEEE International Symposium on Circuits and Systems, May 28-31, 2000, pp. II-17 through II-20, XP010502649.

Han Yona, Method and Apparatus for Mixing of Compressed Video, Dec. 4, 2001, US PTO, US 60337121, pp. 1-40.

Yona, et al., Method and an Apparatus for Mixing Compressed Video, Pub. Jul. 3, 2003, US-2003/0123537.

* cited by examiner

H.263

10a

I PICTURE

14e

| INTRA MBs | NOT COD |
|---|---|
| NOT COD | NOT COD |

P PICTURE

10b

P PICTURE

14f

| INTER MBs | NOT COD |
|---|---|
| NOT COD | NOT COD |

P PICTURE

P FRAME

P FRAME

132 | C1 | C2 | C3 | C4 | N1 | N2 | N3 | C5 | C6 | C7 | C8 | N4 | N5 | N6 | N7 | N8 | N9 | N10 | N11 | N12 | N13 | OUT

FIG. 9

| N1 | N2 | N3 | N4 | N5 | N6 | N7 | N8 | N9 | N10 | N11 | N12 | N13 |

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|----|----|----|----|----|----|----|----|----|----|----|----|
| 0 | A | A | A | A | A | A | A | A | A | A | A | A | A | A | A | A | A | A | A | A | A | A |
| 1 | A | A | A | A | A | A | A | A | A | A | A | A | A | A | A | A | A | A | A | A | A | A |
| 2 | A | A | A | A | A | A | A | A | A | A | A | A | A | A | A | A | A | A | A | A | A | A |
| 3 | A | A | A | A | A | A | A | A | A | A | A | A | A | A | A | A | A | A | A | A | A | A |
| 4 | A | A | A | A | A | A | A | A | A | A | A | A | A | A | A | A | A | A | A | A | A | A |
| 5 | A | A | A | A | A | A | A | A | A | A | A | A | A | A | A | A | A | A | A | A | A | A |
| 6 | A | A | A | A | A | A | A | X | X | X |   |   |   |   |   |   |   |   |   | B | B | B |
| 7 | B | B | B | B | B | B | B | B |   |   |   |   |   |   |   |   |   |   |   | C | C | C |
| 8 | C | C | C | C | C | C | C | C |   |   |   |   |   |   |   |   |   | X | X | D | D | D |
| 9 | D | D | D | D | D | D | D | D | X | X | X |   |   |   |   |   |   |   |   |   |   |   |
| 10 |   |   |   |   |   |   |   |   |   |   |   |   |   |   |   |   |   |   |   |   |   |   |
| 11 |   |   |   |   |   |   |   |   |   |   |   |   |   |   |   |   |   |   |   |   |   |   |
| 12 |   |   |   |   |   |   |   |   |   |   |   |   |   |   |   |   |   |   |   |   |   |   |
| 13 |   |   |   |   |   |   |   |   |   |   |   |   |   |   |   |   |   |   |   |   |   |   |
| 14 |   |   |   |   |   |   |   |   |   |   |   |   |   |   | X | X | X | X | E | E | E | E |
| 15 | E | E | E | E | E | E | E | E | E | E | E | E | E | E | E | E | E | E | E | E | E | E |
| 16 | E | E | E | E | E | E | E | E | E | E | E | E | E | E | E | E | E | E | E | E | E | E |
| 17 | E | E | E | E | E | E | E | E | E | E | E | E | E | E | E | E | E | E | E | E | E | E |

— 172

EACH "X" REPRESENTS A MACROBLOCK
TO BE SKIPPED IN THE SOURCE PICTURE

FIG. 14B

TABLE I

| TIME SEQUENCE | COMPONENT PICTURES FROM A | | | COMPONENT PICTURES FROM B | | | COMPOSITE PICTURES C | | | | | | | |
|---|---|---|---|---|---|---|---|---|---|---|---|---|---|---|
| | FRAME NO. | REFERENCE FRAME LIST | | FRAME NO. | REFERENCE FRAME LIST | | FRAME NO. | REFERENCE FRAME LIST (FRAME NUMBERS AS IN A OR B) | | | | REFERENCE FRAME LIST (FRAME NUMBERS AS IN C) | | | |
| | | 0 | 1 | | 0 | 1 | | 0 | 1 | 2 | 3 | 0 | 1 | 2 | 3 |
| 1 | 260 | 260 | - | | | | 480 | 260 | - | - | - | 480 | - | - | - |
| 2 | | | | 370 | 370 | - | 481 | 370 | 260 | - | - | 481 | 480 | - | - |
| 3 | 261 | 261 | 260 | | | | 482 | 261 | 370 | 260 | - | 482 | 481 | 480 | - |
| 4 | | | | 371 | 371 | 370 | 483 | 371 | 261 | 370 | 260 | 483 | 482 | 481 | 480 |
| 5 | 262 | 262 | 261 | | | | 484 | 262 | 371 | 261 | 370 | 484 | 483 | 482 | 481 |
| 6 | | | | 372 | 372 | 371 | 485 | 372 | 262 | 371 | 261 | 485 | 484 | 483 | 482 |
| 7 | | | | 373 | 373 | 372 | 486 | 373 | 372 | 262 | 261 | 486 | 485 | 484 | 482 |

FIG. 15

TABLE II

| TIME SEQUENCE | COMPONENT PICTURES FROM A | | | COMPONENT PICTURES FROM B | | | COMPOSITE PICTURES C | | | | | | | | | |
|---|---|---|---|---|---|---|---|---|---|---|---|---|---|---|---|---|
| | FRAME NO. | REFERENCE FRAME LIST | | FRAME NO. | REFERENCE FRAME LIST | | FRAME NO. | CONTENT OF PICTURE A/B THAT RESIDES IN PICTURE C | REFERENCE FRAME LIST (FRAME NUMBERS AS IN A OR B) | | | | REFERENCE FRAME LIST (FRAME NUMBERS AS IN C) | | | |
| | | 0 | 1 | | 0 | 1 | | | 0 | 1 | 2 | 3 | 0 | 1 | 2 | 3 |
| 1 | 260 | 260 | - | | | | 480 | 260 | 260 | - | - | - | 480 | - | - | - |
| 2 | | | | 370 | 370 | - | 481 | 260, 370 | 370 | 260 | - | - | 481 | - | - | - |
| 3 | 261 | 261 | 260 | | | | 482 | 261, 370 | 261 | 370 | 260 | - | 482 | 481 | - | - |
| 4 | | | | 371 | 371 | 370 | 483 | 261, 371 | 371 | 261 | 370 | - | 483 | 481 | - | - |
| 5 | 262 | 262 | 261 | | | | 484 | 262, 371 | 262 | 371 | 261 | 370 | 484 | 483 | 481 | - |
| 6 | | | | 372 | 372 | 371 | 485 | 262, 372 | 372 | 262 | 371 | 261 | 485 | 483 | - | - |
| 7 | | | | 373 | 373 | 372 | 486 | 373, 262 | 373 | 372 | 262 | 261 | 486 | 485 | 483 | - |

FIG. 16

IMPLEMENTATION OF MPCP MCU TECHNOLOGY FOR THE H.264 VIDEO STANDARD

CROSS REFERENCE TO RELATED APPLICATIONS

This application (i) claims the benefit of U.S. Provisional Application No. 60/581,153, filed Jun. 18, 2004 which is incorporated by reference in its entirety and (ii) is a continuation-in-part of U.S. patent application Ser. No. 11/071,147, filed Mar. 3, 2005 which is a continuation-in-part of U.S. patent application Ser. No. 10/212,831, filed Aug. 5, 2002, now abandoned which are hereby incorporated by reference in their entirety.

FIELD OF THE INVENTION

The present invention relates to video conferencing generally and, more particularly, to an implementation of Multi-Point Continuous-Presence (MPCP) Multipoint Control Unit (MCU) technology for the H.264 video standard.

BACKGROUND OF THE INVENTION

Many commercially available video conferencing systems only provide point-to-point video conferencing. Multipoint video conferencing uses an MCU (Multipoint Control Unit or conference unit). An MCU can operate either in a switched presence mode or continuous presence mode. In the switched presence mode, only one video stream is selected and transmitted to all of the participants based on either an audio signal or a "chairman" switch control. In continuous presence mode, the MCU receives video signals from each participant in a video conference, combines the signals to produce a single signal and sends the combined signal back to each participant. The combined signal enables each participant to view on one screen the pictures of the other participants along with his or her own picture on a real time basis using a split-screen. The sophisticated structure and large computation power of an MCU presently results in implementations of conventional MCUs on central servers. Some providers of MCU systems claim that their MCU software can be operated on a desktop personal computer. However, such MCU systems apparently support only the switched presence multipoint operation or produce a video stream in proprietary formats such that each participant installs special video conferencing software or apparatus.

SUMMARY OF THE INVENTION

The present invention concerns a method for generating a video output signal. The method may include receiving a plurality of input video signals from each of the participants. Each of the input video signals may have a plurality of input frames. Each of the input frames may have one or more source slices carrying an image. Each of the input frames may be encoded using one or more respective reference frames at an encoding time. The method may include a step for generating the video output signal for transmission to the participants. The video output signal may comprise a plurality of output frames. A first of the output frames generally has at least a first slice having (a) a first coded portion carrying the image from a first of the participants and (b) a first unencoded portion for the image from a second of the participants. A second of the output frames generally has at least a second slice having (a) a second coded portion carrying the image from the second participant and (b) a second unencoded portion for the image from the first participant. The frames of the video output signal are generated as soon as one of the frames of the video input signal are received.

The objects, features and advantages of the present invention include providing a continuous-presence multipoint control unit system and/or method that may (i) combine individual video streams without decoding and recoding, (ii) improve computational complexity over conventional techniques, (iii) enable an arbitrary size for a picture of each participant in a video conference, (iv) enable a variable shape for the picture of each participant in the video conference and/or (v) provide compatibility with the H.264 video standard.

BRIEF DESCRIPTION OF THE DRAWINGS

These and other objects, features and advantages of the present invention will be apparent from the following detailed description and the appended claims and drawings in which:

FIG. 4A is a diagram of an example insertion of component pictures into composite frames per H.263;

FIG. 9 is a diagram of the macroblocks of a Picture B in a composite video stream;

FIG. 12 is a diagram of Slice C in transmission order;

FIG. 14B is a diagram of a composite frame having a component picture;

FIG. 15 is a first table of an example time sequence for conversion from two sources;

FIG. 16 is a second table of an example time sequence for conversion from two sources;

DETAILED DESCRIPTION OF THE PREFERRED EMBODIMENTS

Figure 1:
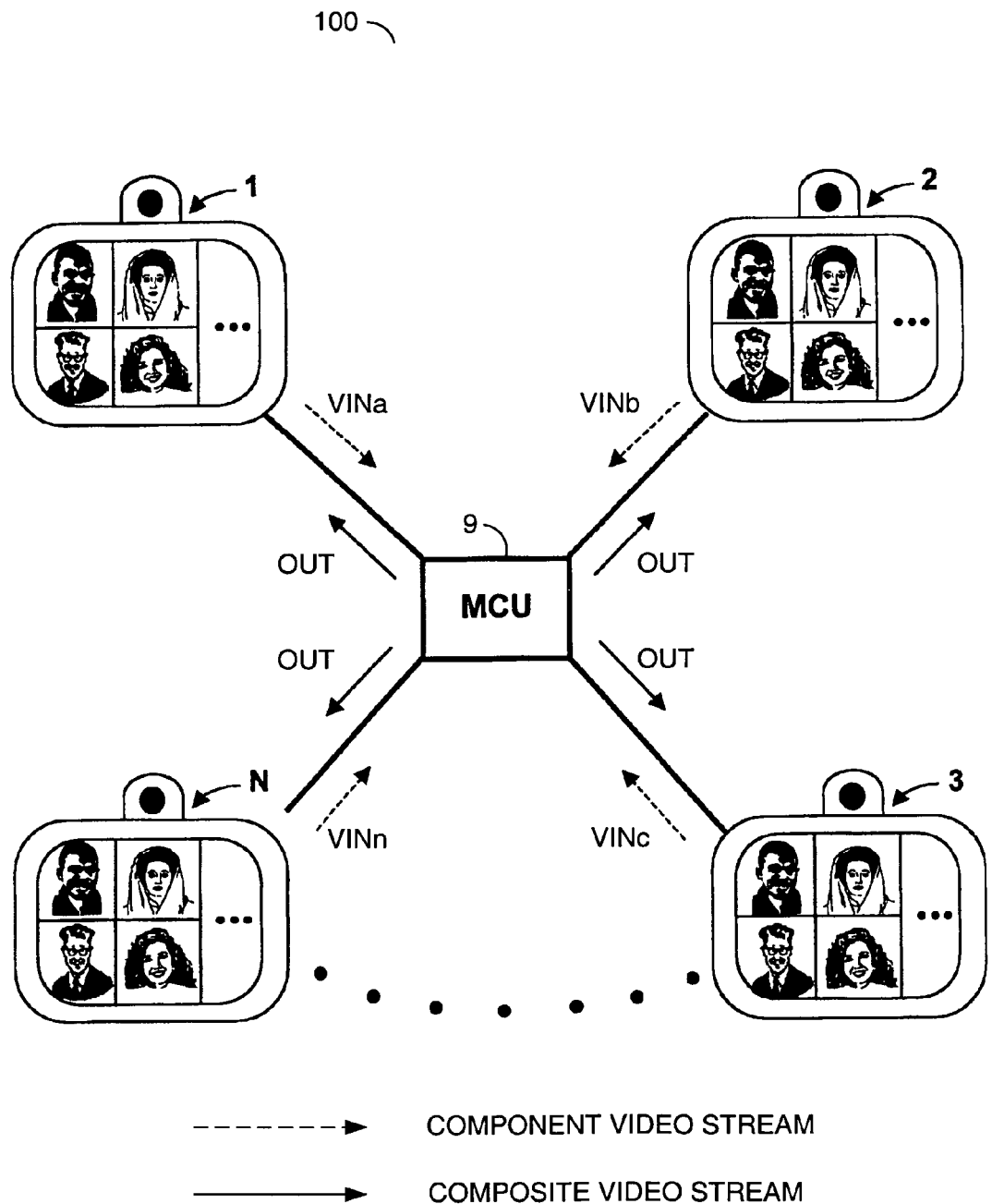
FIG. 1 is a diagram of a system in accordance with a preferred embodiment of the present invention.

Referring to FIG. 1, a diagram of a system 100 is shown in accordance with a preferred embodiment of the present invention. The system 100 generally concerns a Multi-Point Continuous-Presence (MPCP) Multipoint Control Unit (MCU) technology for combining component video streams from multiple sources into one or more common and/or unique composite video streams for delivery to the participants of a videoconference, as illustrated in FIG. 1. The system 100 may be referred to as an MPCP system. In one embodiment, the MPCP system may present a copy of the common composite video stream to each of the participants. In another embodiment, the MPCP system may present each participant with a unique composite video stream.

The MPCP system 100 generally comprises multiple endpoint devices (or circuits) 1-N and an MCU device (or circuit) 9. Each of the endpoint devices 1-N may present a signal (e.g., VINa-VINn) to the MCU circuit 9. The MCU device 9 may present multiple signals (e.g., OUT shown in four places) to each of the endpoint devices 1-N. The MCU device 9 and the endpoint devices 1-N may be implemented as (i) hardware-only devices, (ii) a combination of hardware and software, (iii) a combination of hardware and firmware and/or (iv) a combination of hardware, software and firmware.

Each of the signals VINa-VINn may be implemented as a video bitstream carrying both visual and audio information of a participant in a video conference. The signals VINa-VINz may be referred to as component video streams. As used herein, the term "component video stream" is generally meant to mean video streams carrying single participant images. The term component video stream should not be confused with a component video connection of a conventional television or DVD player in which the brightness and color portions of the signal are separated. The signal OUT may be implemented as a video bitstream carrying both visual and audio information of all of the participants in the video conference. The signal OUT may be referred to as a composite video stream. As used herein, the term "composite video stream" is generally meant to mean a video stream carrying multiple participant images. The term composite video stream should not be confused with a composite video connection of a conventional television or DVD player in which brightness and color portions of the signal are combined. The signal OUT may be (i) multiple copies of a common composite video stream (shown) or (ii) multiple unique signals (e.g., OUTa-OUTn, not shown), one to each of the endpoint devices 1-N.

The video streams VINa-VINn and OUT may be compliant with the ITU-T H.264(E)(03/05) video standard, "Advanced Video Coding", published March, 2005 by the International Telecommunication Union-Telecommunication Standardization Sector, Geneva, Switzerland, also known as the ISO/IEC 14496-10 video standard "Information Technology—Coding of Audio-Visual Objects—Part 10: Advanced Video Coding" published by the International Organization for Standardization/International Electrotechnical Commission, Geneva, Switzerland. An H.263 video standard may be defined by the ITU-T recommendation H.263 (02/98), "Video Coding For Low Bit Rate Communications", published February, 1998 by the International Telecommunication Union-Telecommunication Standardization Sector, Geneva, Switzerland.

The MPCP system 100 may be orders of magnitude more computationally efficient than conventional MCU systems and still deliver video quality that rivals the best conventional hardware-based MCUs on the market. Such improvements in performance may be possible, because, unlike conventional MCU technologies, the MPCP system 100 generally does not involve any decoding of the incoming signals VINa-VINn or recoding of the outgoing video signals OUT. Instead, each time an MPCP-based MCU 9 receives a new component video picture from a component video stream VINa-VINn, the MCU device 9 may make some adjustments to the header and coded-domain data. The MCU device 9 normally waits for a complete picture to be received before transcoding the picture into the composite video streams OUT. The modified data is then transmitted to one or more video endpoint device 1-N in the composite video streams OUT. Each endpoint device 1-N generally updates only that portion of the composite image corresponding to the source component video stream VINa-VINn from which the component image was received. Additional details regarding the MPCP technology may be found in U.S. Pat. No. 6,535,240 and co-pending U.S. patent application Ser. No. 10/212,831, which are hereby incorporated by reference in their entirety.

Figure 2:
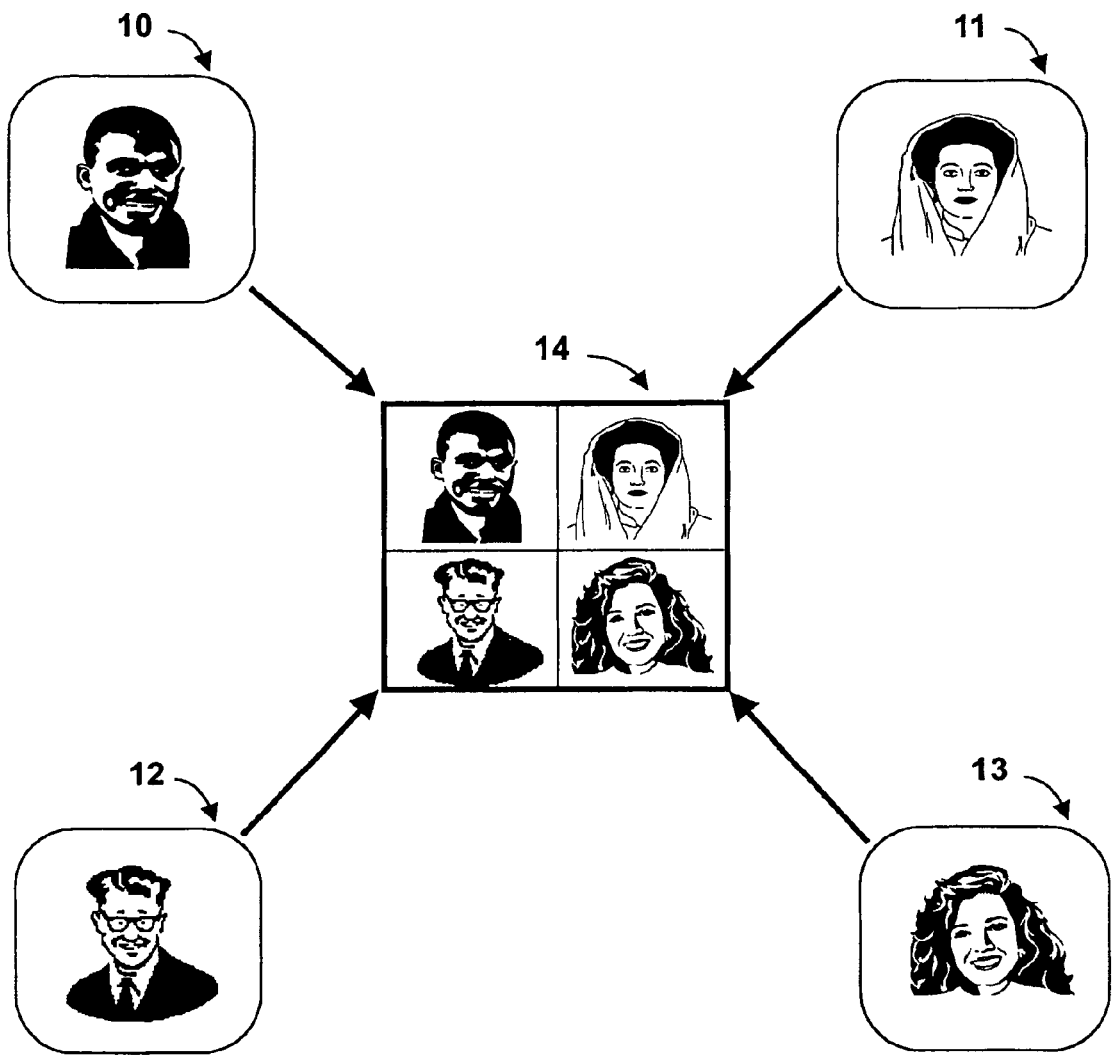
FIG. 2 is a diagram illustrating the result of the operation of a Multi-Point Continuous-Presence based Multipoint Control Unit device.

Referring to FIG. 2, a diagram illustrating the result the of operation of the MPCP-based MCU device 9 is shown. Each of the endpoint devices 1-N may generate a component video stream VINa-VINn having a Quarter Common Intermediate Format (QCIF) frame (e.g., frames 10, 11, 12 and 13). The incoming component QCIF frames 10, 11, 12, 13 may be manipulated by the MCU device 9 to form the composite video streams OUT. A series of outgoing composite Common Intermediate Format (CIF) frames (e.g., a frame 14) are generated. The frame 10 may be used to generate a first output frame. The frame 11 may be used to generate a second output frame, and so on. When the output frames are decoded, the effect of a series of a single combined composite frames is created. However, in each output frame, only a single QCIF frame is updated.

Figure 3:
FIG. 3 is a diagram of multiple common intermediate format frames.

Referring to FIG. 3 a diagram of multiple CIF frames 14a-14d (e.g., CIF frame 14 at different times) are shown. The MPCP system 100 generally converts the QCIF frames 10-13 into CIF frames 14. The macroblocks comprising the original frames 10-13 may be inserted into target locations in the larger composite frames 14, with appropriate adjustments to headers and the coded video data.

In general each new (or updated) component frame 10-13 may be received by the MCU device 9 at a different time relative to the other component frames 10-13. Therefore, the MCU device 9 may generate different CIF frames 14 (e.g., frames 14a-14d) at the different times in the composite video stream OUT. Each of the component frames 14a-14d may be generated using the data from only one of the component frames 10-13. The rest of the composite frame may be filled with "Not Coded" macroblocks. For example, a composite frame 14a may have data for the image of the participant from the endpoint device 1 in an upper left-hand quadrant while the remaining three quadrants may be unchanged. Likewise, a composite frame 14b may have data for the image of the participant from the endpoint device 2 in an upper right-hand quadrant while the remaining three quadrants may be unchanged. Similar component frame generations may be performed for the frames 14c and 14d using the data of the participants from the endpoints 3 and 4, respectively.

Referring to FIG. 4A, a diagram of an example insertion of component pictures 10a-10b into composite frames 14e-14f according to the H.263 standard is shown. The MCU device 9 generally converts each incoming frame from the component video streams VINa-VINn, whether an I-picture or a P-picture, into a P-picture having the same picture format, such as CIF, as the composite video stream OUT. As such, the composite frame, when sent out to the participating video endpoints 1-N, generally updates only the portion of the composite video image corresponding to the endpoint from which the component frame originates. For example, an intra-coded frame (e.g., I-picture 10a) received in the component video stream VINa may be converted to a P-picture and inserted into an inter-coded composite frame (e.g., P-picture 14e) of the composite video stream OUT. In another example, an inter-coded frame (e.g., P-picture 10b) received in the component video stream VINa may be inserted into an inter-coded composite frame (e.g., P-picture 14f) on the composite video stream OUT.

Figure 4B:
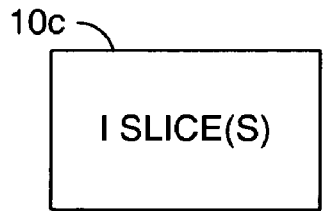
FIG. 4B is a diagram of an example insertion of component pictures into composite frames per H.264.
Figure 4B:
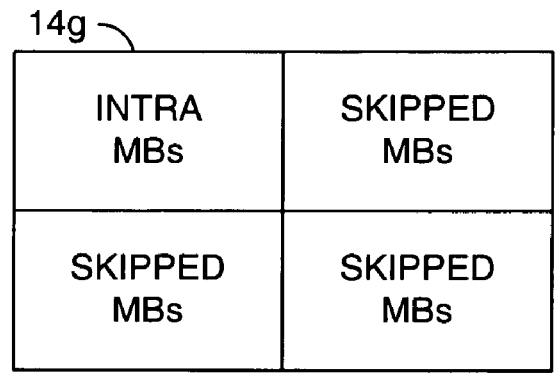
Figure 4B:
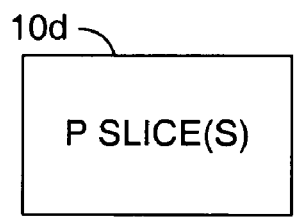
Figure 4B:
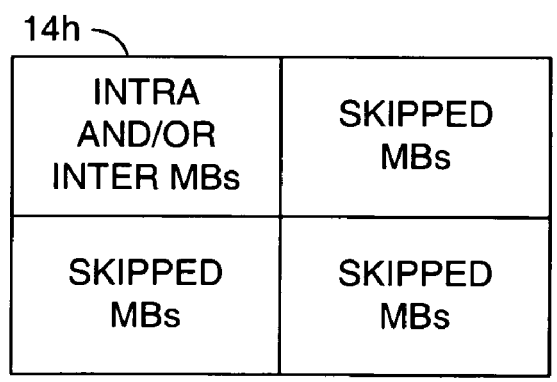

Referring to FIG. 4B, a diagram of an example insertion of component pictures 10c-10d into composite frames 14g-14h per the H.264 standard is shown. In one implementation, the MCU device 9 generally converts each incoming frame from the component video streams VINa-VINn, whether based on I-slices or P-slices (or both), into a P-frame having the same picture format as the composite video stream OUT. As such, the composite frame, when sent out to the participating video endpoints 1-N, generally updates only the portion of the composite video image corresponding to the endpoint from which the component frame originates. For example, an intra-coded slice (e.g., I-slice 10c) received in the component video stream VINa may be converted to a P-slice inserted into an inter-coded composite frame (e.g., P-frame 14f) of the composite video stream OUT. In another example, an inter-coded frame (e.g., P-slice 10d) received in the component video stream VINa may be inserted into an inter-coded composite frame (e.g., P-frame 14h) on the composite video stream OUT. The H.264 frame 10c and the H.264 frame 10d may be viewed as similar to the H.263 I-Picture 10a and the H.263 P-Picture 10b, respectively. Using terminology from the H.264 standard, an I-slice-only based frame may be referred to as an Instantaneous Decoder Refresh (IDR) frame if all previously decoded references frames have been marked as "unused for reference". A decoder may decode an IDR frame without the assistance of a reference frame. The decoder may then use the decoded IDR frame as an initial reference frame or a new reference frame.

Figure 5:
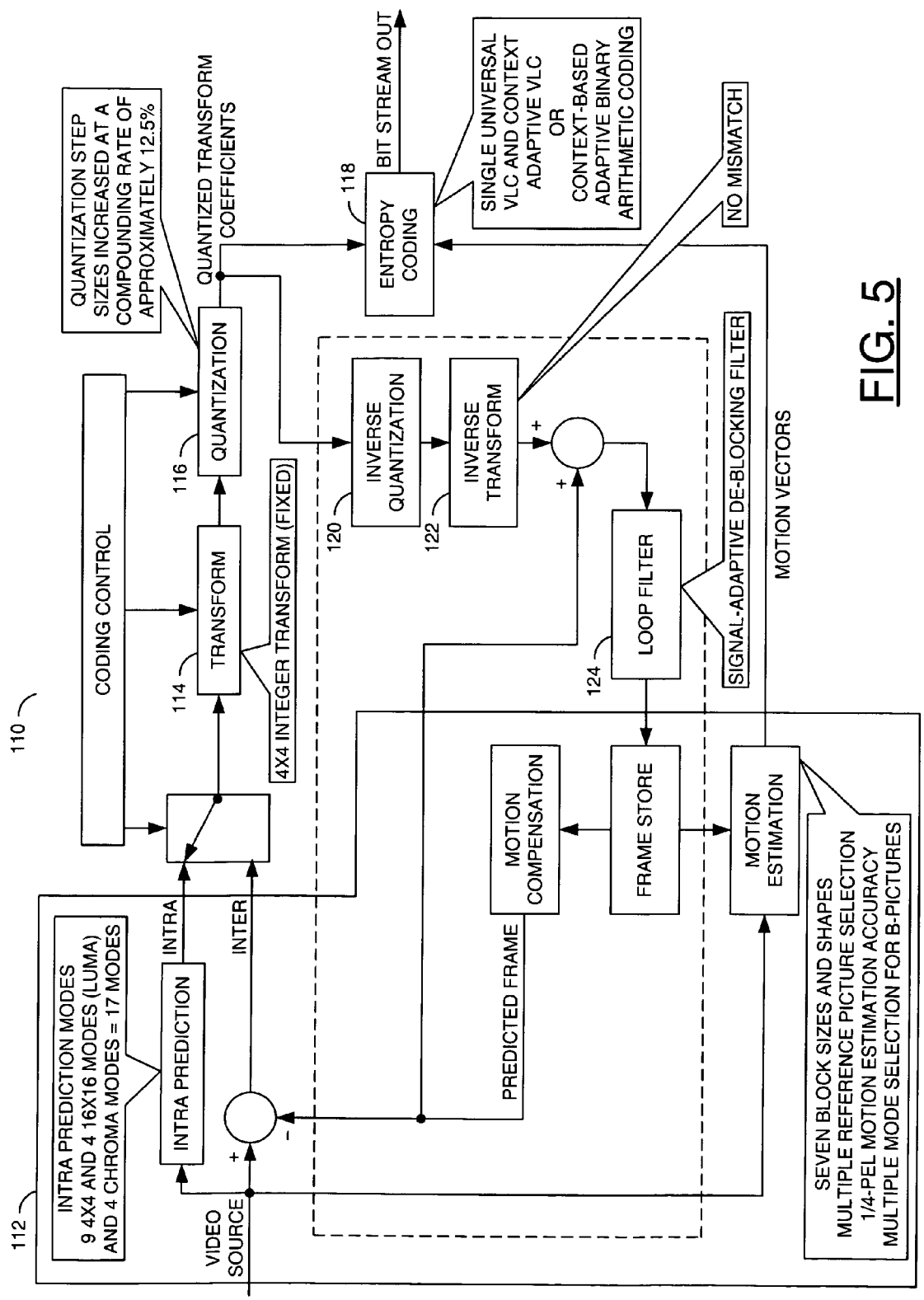
FIG. 5 is a functional block diagram of an H.264 encoder.

Referring to FIG. 5, a functional block diagram of an H.264 encoder 110 is shown. The H.264 video standard was finalized by the Joint Video Team (JVT) and adopted by the committees of both ITU-T and ISO/IEC JTC1 (also known as MPEG-4, Part-10) in 2005. The key advantages of H.264/MPEG-4 over previous video standards generally include lower bit rates, higher video quality and resiliency to network errors. The H.264 encoder 110 generally includes the same four basic functional elements as an H.263 encoder. The H.264 encoder 110 may comprise a prediction function (or element) 112, a transform function (or element) 114, a quantization function (or element) 116 and an entropy coding function (or element) 118. The H.264 encoder 110 may also include an inverse quantization function (or element) 120, an inverse transform function (or element) 122 and a loop filter function (or element) 124.

Whereas H.264 includes innovations in the prediction element 112, the transform element 114, the quantization element 116 and the coding element 118 (indicated in the text boxes in FIG. 5), only changes to the prediction element 110 may be relevant to the operation of the MPCP system 100. Changes caused by the H.264 standard to the transform element 114, the quantization element 116 and the entropy coding element 118 may be transparent to the MPCP system 100.

Unlike H.263, which defines the "Intra" (I) and "Inter" (P) coded types in the picture layer, the H.264 standard generally defines the intra and inter coded types in one or more slice layers. A frame compliant with the H.264 standard may have one or more slices. An I-slice contains only intra-coded macroblocks. A P-slice generally contains intra-coded macroblocks and/or inter-coded macroblocks. The MPCP system 100 may utilize a "Not Coded" or "Skipped Macroblock" feature of the H.263/H.264 standards that commands a decoder to do nothing and leave the contents of the macroblocks unchanged from the previous frame.

Figure 6:
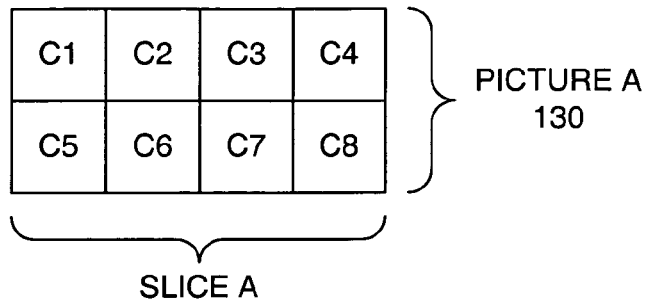
FIG. 6 is a diagram of a frame of a component Picture A with macroblocks C1-C8.
Figure 7:
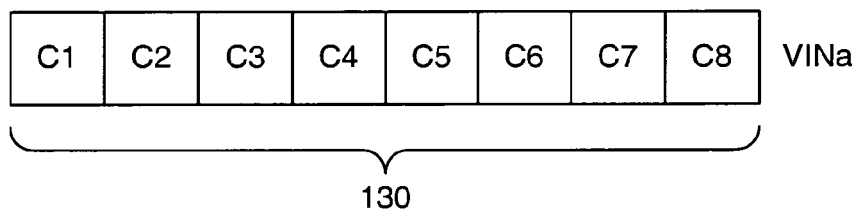
FIG. 7 is a diagram of the macroblocks of the Picture A in a sequential order for transmission.
Figure 8:
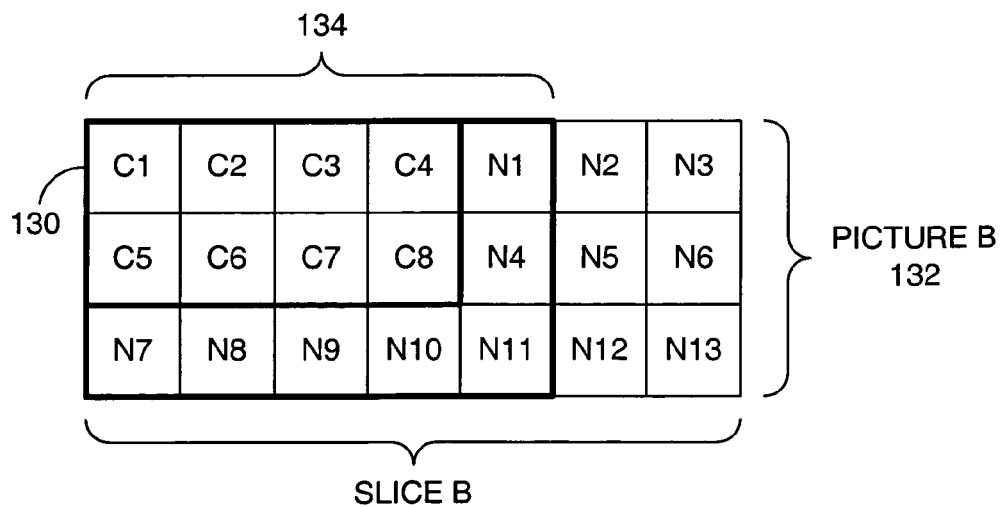
FIG. 8 is a diagram of the macroblocks of the Picture A in a composite frame.

Referring to FIG. 6, a diagram of a frame 130 of a component Picture A with macroblocks C1-C8 is shown. FIG. 7 generally illustrates a diagram of the macroblocks of the Picture A in a sequential order for transmission. FIG. 8 generally illustrates a diagram of the macroblocks of the Picture A in a composite frame 132. FIG. 9 may illustrate a diagram of the macroblocks of a Picture B in a composite video stream OUT. Implementation of the MPCP system 100 for the H.264 video standard may be similar to that outlined above for the H.263 standard, with I-slices and P-slices taking the place of I-pictures and P-pictures. As an example, the frame 130 in FIG. 6 generally comprises the Picture A having a single Slice A that contains a number (e.g., 8) of macroblocks (e.g., macroblocks C1-C8). Following a raster-scan order, the macroblocks in the Slice A may be laid out in the sequence for transmission in a component video stream (e.g., VINa), as shown in FIG. 7. The MCU device 9 may insert the contents of Picture A into a predetermined location (e.g., the upper-left corner) of a composite frame 132 (e.g., Picture B) in a P-slice equal in resolution to the composite video stream VINa. If the Picture A is an I-slice, the macroblocks C1-C8 may be coded as intra macroblocks in the Picture B. If the Picture A is a P-slice, the macroblocks C1-C8 may retain the original coding type (e.g., Intra or Inter) when inserted into the Picture B. The rest of the Picture B may be filled with "Skipped Macroblocks" (denoted "Nx", where $1 \leq x \leq 15$) by the MCU device 9. Since the Picture B comprises a single P-slice (e.g., Slice B), the macroblocks may be transmitted in the composite video signal OUT in a sequence illustrated in FIG. 9.

Because MPCP-based MCU device 9 depends on features of the prediction element 112 for operation, changes to the prediction element 112 introduced in the H.264 standard may be considered for potential impact. A first change caused by the H.264 standard may be an introduction of intra prediction, a method of improving intra coding efficiency by reducing spatial redundancies prior to transformation. Samples within an intra-predicted macroblock may be predicted from samples in a current slice that have already been encoded, decoded and reconstructed. Since all of the pixels in the source slice (e.g., Slice A) retain the same relative position in the transcoded slice (e.g., Slice B), intra prediction generally does not affect the operation of the MPCP system 100.

Other new features of the H.264 standard related to the prediction element 120 may include (i) variable block-size motion compensation and (ii) quarter-pixel motion compensation accuracy. The variable block-size motion compensation and quarter-pel motion compensation accuracy features generally do not affect the operation of MPCP as long as the composite video stream OUT follows the encoding of macroblocks in the source component video streams VINa-VINn.

Two new features of the H.264 standard that should be considered in the operation of the MPCP system 100 may include (i) unrestricted motion vectors and (ii) a use of multiple reference frames. The unrestricted motion vector capability may be turned off during a call set-up or handshake process in the MPCP system 100. The absence of the unrestricted motion vector capability may create only a slight penalty in terms of coding efficiency.

Figure 10:
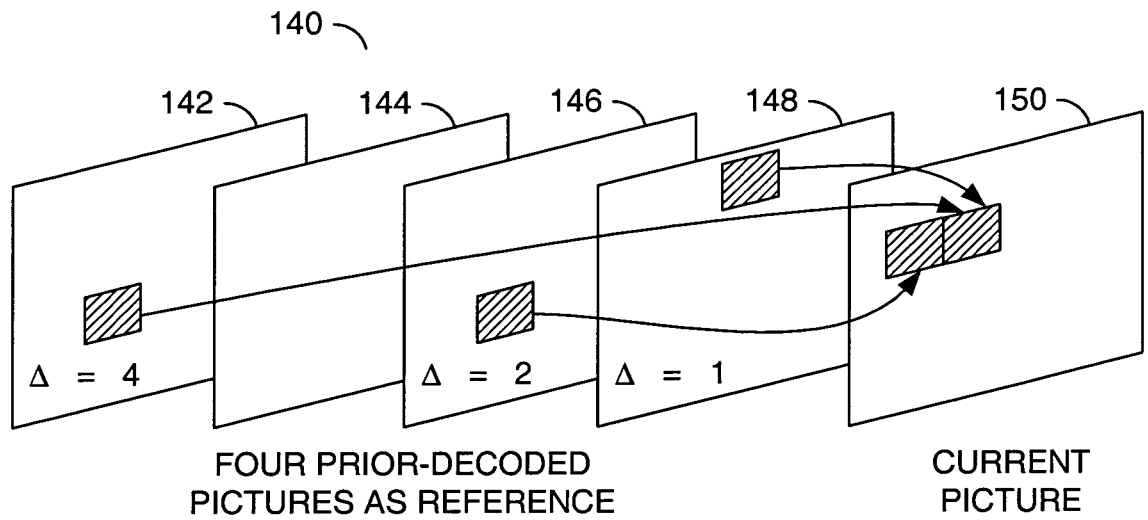
FIG. 10 is a diagram of a multiple reference frame example.

Referring to FIG. 10, a diagram of a multiple reference frame example 140 is shown. In the example 140, four reference frames 142-148 may be used to encode and/or decode a current picture 150. The multiple reference frames feature may be handled in one of two ways. First, during the call set-up or handshake process, each endpoint device 1-N may be limited to the use of a single reference frame for encoding the component frames 10-13 and/or decoding the composite frames 14. By limiting the endpoint devices 1-N to a single reference frame, the MPCP system 100 may operate with the H.264 standard in a similar manner as with the H.263 standard. The call set-up may also be used to instruct that various encoders and decoders of the system that the single reference frame may be a short-term reference frame. Such an implementation may only be practical in a system that allows a call set-up to specify a short-term reference frame. For example, the particular version of H.264 implemented would need to allow such a set-up for the system 100 to implement such a feature.

A second approach for handling the multiple reference frame situation generally involves each participating endpoint device 1-N being allocated the use of a certain number of reference frames during the call set-up or handshaking operation. The reference frame allocation may be subject to a condition that a total number of reference frames allocated among all of the endpoints devices 1-N does not exceed a predetermined maximum number (e.g., 16 reference frames per the H.264 standard). A reference picture list (see FIGS. 15 and 16) for the composite picture may be set up, using reference picture reordering and memory management control. Based on the reference picture list, for each component picture 10-13, a reference picture number may be set to a value that points to one or more composite pictures 14 containing one or more component pictures 10-13 to be used as a reference picture in generating a component video stream VINa-VINn.

Figure 11:
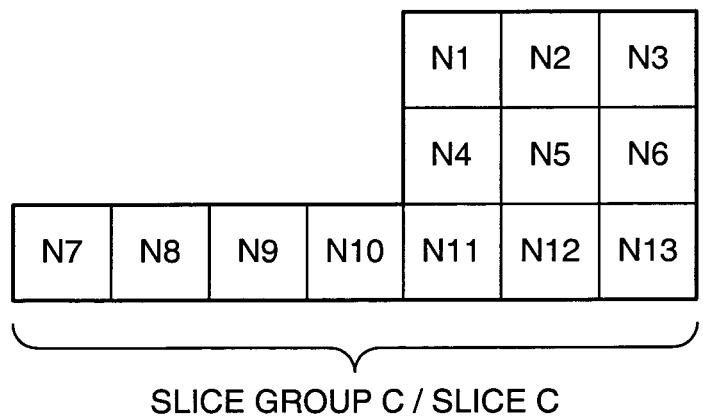
FIG. 11 is a diagram of skipped macroblocks in a Slice Group C.

An alternative approach to implementing the MPCP system 100 for the H.264 video standard may be based on a "Slice Group" feature of the H.264 standard. As an example, the portion of the component frame 130/Slice A holding the Picture A (e.g., macroblocks C1-C8) may be designated as a foreground slice group while the unencoded potion of the Picture B (e.g., macroblocks N1-N13) may be designated a background slice group (e.g., Slice Group C), as shown in FIG. 11. Slice group C may be coded as a single P-slice (e.g., Slice C) containing only "Skipped Macroblocks". Slice C may be transmitted in a sequence of N1 to N13, as illustrated in FIG. 12. In the above approach, the Picture A may be coded within the composite frame 132 as a single, rectangular slice of the same type (I or P) as in the source component frame 130.

The "Slice Group" feature of the H.264 standard may also give additional flexibility in situations in which multiple component frames 10-13 from different endpoint devices 1-N may be received for processing by the MCU device 9 approximately simultaneously. In such cases, the MPCP system 100 may designate the simultaneously received frames as foreground slices and the remaining area as a background slice.

Another difference between the H.264 standard and the H.263 standard is that video streams compliant with the H.263 standard may conform to one of five standard picture formats: sub-QCIF, QCIF, CIF, 4CIF, or 16CIF. In contrast, the H.264 standard generally allows for custom picture formats having any integral number of macroblocks. The MPCP system 100 may take advantage of the custom picture format feature to provide a Flexible Screen Layout (FSL) capability.

Using FSL, when the MPCP technique is applied to an H.264 compliant video stream, the component images that make up the composite video image may be of an arbitrary size and a variable shape. A possible application of FSL may be that, since the sizes of the screens of most video endpoint devices 1-N are generally limited, the composite video frames 14 may be configured so that the image of an active speaker is larger than the images of the other participants. For example, an active speaker in the frame 130 (FIG. 6) may be expanded by one or more macroblock rows and one or more macroblock columns such that the Picture A covers a larger area 134 (e.g., macroblocks C1-C8, N1, N4 and N7-N10) in the composite frame 132 (FIG. 8). Another possible application of the FSL may be that the images presented to the participants may be square (e.g., C1, C2, C5 and C6 in FIG. 6), other rectangular shapes, non-rectangular shapes (e.g., "L" shape generated at a source or a non-rectangular combination of multiple rectangles) or other shapes.

Where the display screen of a participant is limited in resolution, the endpoint device may show only some of the images of the various participants. For example, as illustrated in FIG. 1, one or more of the participant images may be partially and/or completely off the display screen (e.g., off the right side of the screen). In another example, a participants image may simply not be displayed. Control over which images are fully displayed and which images are partially displayed/hidden may be given to the user via an appropriate input mechanism (e.g., a keyboard stroke or a button on an infrared hand-held controller). The participant control may include control over the size and shape of the images. A default (or predetermined) size and shape for each of the images may be implemented as a single key/button activation.

Figure 13:
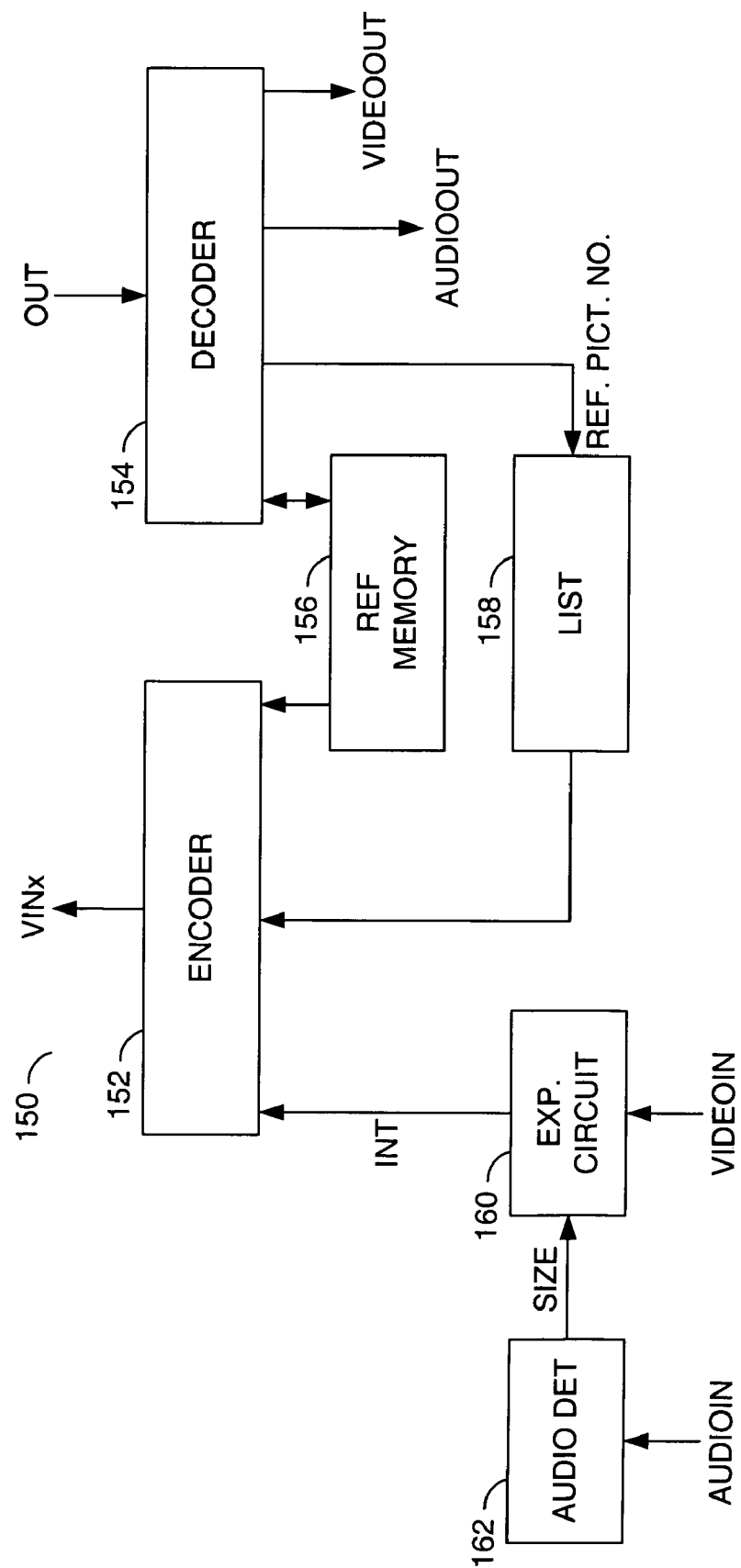
FIG. 13 is a functional block diagram of an example implementation of an endpoint device.

Referring to FIG. 13, a functional block diagram of an example implementation of an endpoint device 150 is shown. The endpoint device module 150 may represent any one or more of the endpoint devices 1-N illustrated in FIG. 1. The endpoint device 150 generally comprises an encoder module (or circuit) 152, a decoder module (or circuit) 154, a reference memory module (or circuit) 156, a list module (or circuit) 158, an expansion module (or circuit) 160 and an audio detection module (or circuit) 162.

The audio detection module 162 may be operational to generate a signal (e.g., SIZE) in response to the presence/absence of audio information received via an audio signal (e.g., AUDIOIN) from the participant. The signal SIZE may be in a deasserted (e.g., quiet) state while the information in the signal AUDIOIN is below an adjustable threshold or fixed threshold to indicate that the participant is not speaking. The signal SIZE may be in an asserted (e.g., talking) state while the audio information in the signal AUDIOIN is above the threshold to indicate that the participant is speaking.

The expansion circuit 160 may be operational to generate an intermediate video signal (e.g., INT) based on a video signal (e.g., VIDEOIN) and the signal SIZE. The expansion circuit 160 may pass the input signal VIDEOIN through to the signal INT unchanged while the signal SIZE is deasserted (quiet). The expansion circuit 160 may expand a size of each frame received in the signal VIDEOIN to present an expanded sequence of frames in the video signal INT while the signal SIZE is asserted (talking).

The encoder module 152 may be operational to generate a signal (e.g., VINx) by encoding the signal INT. The signal VINx may be any one of the component video streams VINa-VINn. Encoding may be based on the macroblocks received in the signal INT and one or more reference frames read from the reference memory module 156. Information from the reference picture list 158 may be used to determine which particular reference frame and what portion of the particular reference frame should be used to encode the frames in the signal INT.

The decoder module 154 may present the composite signal OUT having both a video signal (e.g., VIDEOOUT) and an audio signal (e.g., AUDIOOUT). The video signal VIDEOOUT may present the composite frames 14 to the participant. The audio signal AUDIOOUT may present a composite audio stream of all of the participants. The decoder module 154 may also be operational to generate and store the reference frames in the reference memory module 156 and the reference picture list information in the list module 158.

The techniques of the MPCP system 100 may be implemented in applications other than video conferencing. For example, the MPCP system 100 may be used to implement a video on demand and/or near video on demand system. In particular, some of the endpoint devices 1-N (e.g., devices 1-2) may provide audio/video content for consumption by the other endpoint devices 1-N (e.g., devices 3-N). The component video streams VINa-VINb generated by the source endpoint devices 1-2 may be conventional audio/visual programs compliant with the H.264 standard. The consumer endpoint devices 3-N may or may not generate the component video signals VINc-VINn.

Use of the FLS capabilities from the H.264 standard may allow the consumer endpoint devices 3-N to display one or more of the audio/visual programs simultaneously. For example, the participant at the consumer endpoint device 3 may request a single program from the source endpoint devices 1-2 via a communication link (not shown). A first source endpoint device (e.g., device 1) may present the requested program in a format sized to fill the display of the requesting participant. The participant may also request the source endpoint devices 1-2 provide a second program in a picture-in-picture format. A second source endpoint device (e.g., device 2) may present the second requested program in a small slice while the first source endpoint device 1 transmits the "Not Coded" macroblocks in the position of the second program. A second, a third and more picture-in-picture programs may be added to the composite video stream OUT, including programs not displayed at the consumer devices 3-N (e.g., fully off an edge of the screen). The sources not actively displayed may be implemented in order to keep additional content buffered at the source. Such buffering may speed the response experienced by an end user. The multiple images from multiple source endpoint devices may also be presented to the consumer endpoint devices in an array fashion (e.g., FIG. 1). For example, the consumer participants may view (i) multiple sporting events simultaneously, (i) sports, new and weather simultaneously or (iii) any other combination of programs available from the source devices.

Figure 14A:
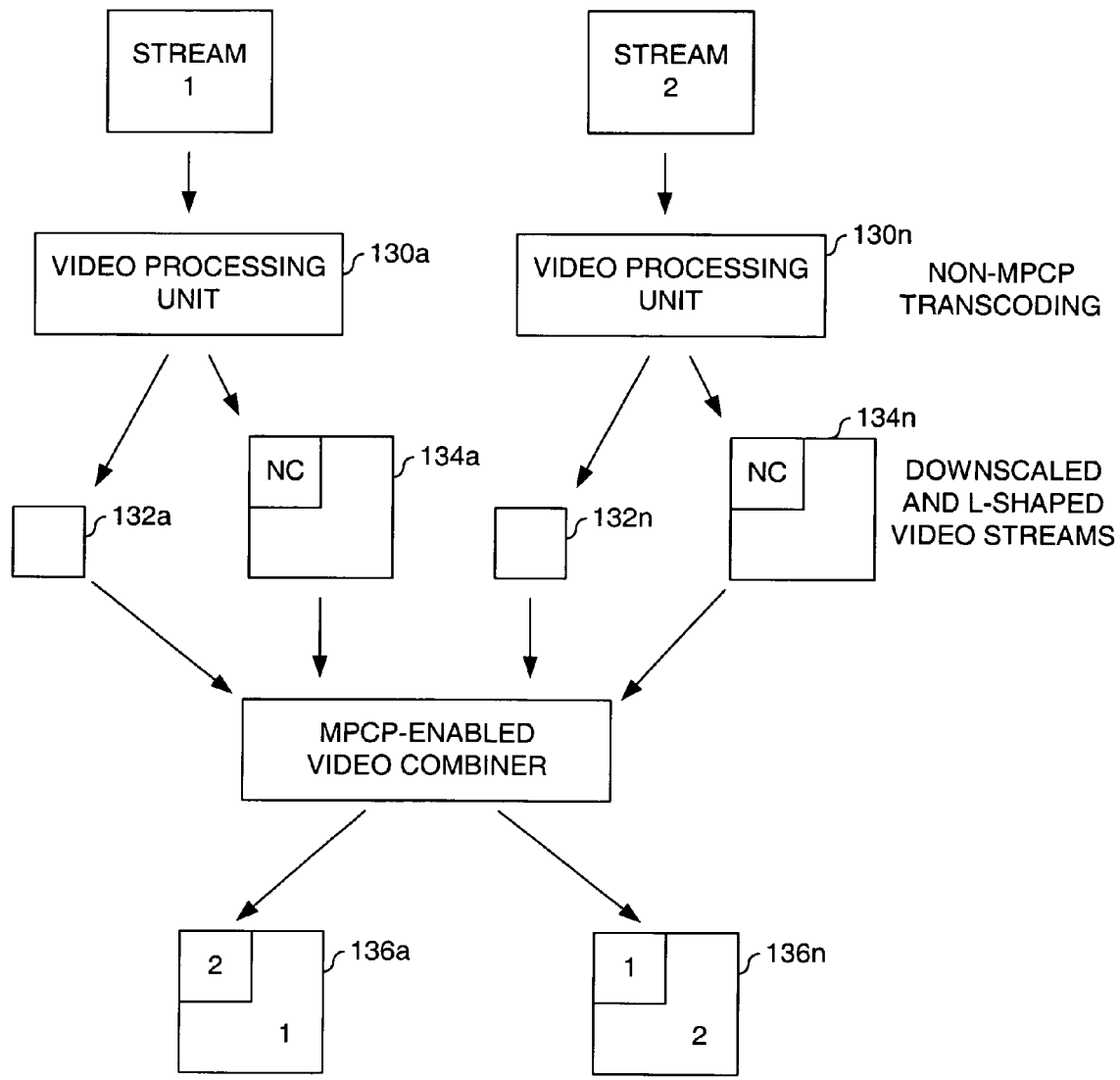
FIG. 14A is a diagram of an implementation of the present invention in a video on demand environment.

Such a video-on-demand implementation may or may not need a proprietary decoder. FIG. 14A illustrates an example of such a system. If a proprietary decoder is implemented, additional features may be added. However, an H.264 output signal may be generated if viewing on a compliant decoder, such as a computer, is desired. Also, a video processing unit 130a-130n may be implemented for each of the source audio/visual programs prior to processing by the MPCP system 100. In one example, a downscaled stream 132a-132n and an L-shaped stream 134a-134n of each of the source audio/visual programs may be implemented. The MPCP system 100 may be used as a video combiner to transcode and multiplex between the downscaled streams 132a-132n and the L-shaped streams 134a-134n to generate the picture-in-picture format output streams 136a-136n. Using the MPCP system 100 to implement such a picture-in-picture format in video-on-demand applications avoids hard-combining such pictures at the source. Avoiding hard-combining may reduce the overall complexity and/or bandwidth specifications of such a system.

In one embodiment, the MPCP system 100 generally does not try to hard combine pictures (frames) from every endpoint device 1-N into a single picture. For example, the composite (combined) picture may contain one and only one picture from one of the endpoint devices 1-N at a time. The MPCP system 100 may only assign a component picture from a endpoint device 1-N to a designated location in the composite picture. The code word "Skipped Macroblocks" (e.g., "Not COD" in FIG. 4) in the CODEC generally instructs the decoders 154 not to change the content of one or more specific macroblocks marked as skipped. By implementing "Skipped Macroblocks", the MPCP system 100 generally updates only a portion of the composite picture in the composite signal OUT where the component picture has been designated. The remaining portions of the composite picture in the composite signal OUT are left unchanged. Pictures from each endpoint device 1-N may be assigned to specific locations in the composite picture, such that pictures from every endpoint device 1-N may make up a complete picture (e.g., frame 14). The MPCP system 100 may update each portion of the composite picture in a "first in first out" manner. From the point-of-view of an end user, the composite picture looks as if all of the component video streams VINa-VINn have been combined into a single video stream. To make sure that the component pictures will be displayed the same as in the composite picture, all the code words in the component bit streams VINa-VINn are normally reused in the composite bit stream OUT, except as specified below.

The following steps may be used in converting from an I-slice to a P-slice. In the H.264 standard, a picture may have one or more slices. In a Baseline profile of the H.264 standard (which is normally suitable for real time video communication), a picture may have I-slices and/or P-slices. Only the P-slices may contain the code word "Skipped Macroblocks". The I-slices may contain only I-macroblocks while the P-slices may contain I-macroblocks as well as P-macroblocks. To implement the code word "Skipped Macroblocks" and without changing the video content of the slice, the MPCP system 100 generally converts each I-slice into a P-slice with all Intra-type macroblocks. The conversion process involves the following:

1. In the slice header, convert the "slice_type" from "I-Slice" to "P-Slice";
2. In the slice data, before the macro block layer, insert a one-bit-code-word "0" to instruct the decoder not to skip the macroblock; and
3. In the macro block layer, increase the mb_type by 5. For instance, if the mb_type in the original slice is 2, mb_type in the converted slice should be 7 (2+5).

In general, no motion vectors may be allowed over picture boundaries in the MPCP system 100. To prevent the content of a component frame in the composite frame from using samples outside of a boundary for inter prediction, a motion_vectors_over_pic_boundaries_flag may be set to 0.

Referring to FIG. 14B, a diagram of a composite frame 170 having a component picture 172 is shown. The frame 170 generally comprises multiple horizontal (e.g., 22) by multiple vertical (e.g., 18) macroblocks. The component picture 172 generally comprises several horizontal (e.g., 11) by several vertical (e.g., 9) macroblocks. The component picture 172 may be designated to a location (e.g., from (8,6) to (18,14)) in the composite frame 170. To designate the component picture 172 to the specific location, the following steps may be used to add skip runs, such as runs of skipped macroblocks.

1. Before the first coded macroblock of the component picture 172, a number of macroblocks above the first row and a number of macroblocks to the left of the first row may be added to a first skip_run. For example, the component picture 172 may have a first skip run of 3 (e.g., the 3 "X" macroblocks in the first row of the component picture 172). The number of macroblocks in the composite frame 170 above and to the left of the first row of the component picture 172 (e.g., the macroblocks marked as "A") may total 140. Therefore, the converted first skip run for the composite frame 170 may be 140+3=143.

2. For the rows between the first and the last row of the component picture 172, a difference of width in macroblock number, may be added to the first skip run of that row. For example, the second row and third row may originally have a skip run number 0. After the conversion, the second row and the third row may each have a skip run number 11 macroblocks. At the end of the first row of the component picture 172, the subsequent macroblocks in the composite frame 170 (e.g., the macroblocks marked as "B") should have the skip run number of the width difference (e.g., 22−11=11). At the end of the second row, the subsequent macroblocks in the composite frame 170 (e.g., the macroblocks marked as "C") should have a skip run number of the width difference (e.g., 22−11=11). The fourth row may have a skip run number 5 (e.g., the last two "X" macroblocks from the third row of the component picture 172 plus the first three "X" macroblocks from the fourth row of the component picture 172). After converting, the last non-skipped macroblock in the third row of the component picture 172 should be followed by a skip run number of 16 (22−11+5).

3. At the end of the last row in the component picture 172, the number of macroblocks below the last row and the number of macroblocks to the right of the first row may be added to the last skip run. For example, the component picture 172 may have an initial last skip run of 4 (e.g., the 4 macroblocks marked as "X" in the last row of the component picture 172). The number of macroblocks below and to the right of the last row (e.g., the macroblocks marked as "E") may total 69. Therefore, the converted last skip run may be 73 macroblocks (69+4). Multiple reference frames permitted by the H.264 standard may be dealt with as follows.

The H.264 standard generally allows up to 16 reference frames. The 16 reference frames may either be short term or long term reference frames. If the number of short term and long term reference frames is equal to the maximum number of frames, the oldest short term reference frame is generally removed from the reference list (known as sliding window memory control) to make room for a next new reference frame. The long term reference frames may remain in the reference list until explicitly removed or replaced. An encoded frame may be either (a) marked as "unused for reference", (b) marked as a short-term reference frame (or picture), (c) marked as a long-term reference frame (or picture) or (d) simply output to the display.

An ideal situation may be to have every component video generated using only an immediately previous frame as the reference frame. Therefore, all of the component video frames and the composite video frames may use one reference frame. In the component video or the composite video, all of the reference frames may stay in the immediate previous frames. No adjustment of the reference frame index may be necessary.

The use of more reference frames than just the immediately previous frame may also be implemented. The only parameter allowed to be set in the H.264 standard may be a num_ref_frames (number of reference frames) in a sequence parameter set. No parameter may be available to instruct the encoders 152 to use every immediately previous frame and only the immediately previous frame as the reference frame. Therefore, the handshake protocol may specify the use of multiple reference frames.

In the present invention, the following technique may be used to deal with the multiple reference frames. The MCU device 9 generally allows each component frame from the endpoint devices 1-N to have a multiple number of reference frames as long as the total number of reference frames (e.g., R) does not exceed the maximum number of reference frames. The MCU device 9 may send a composite video to each endpoint device 1-N that uses the total number R as the num_ref_frames. The MCU device 9 may generate tables that keep track of the reference frame list from the component video and the composite video, such that each composite frame may find the appropriate reference frame indices.

Referring to FIG. 15, a first TABLE I of an example time sequence for conversion from two sources is shown. The example time sequence is generally illustrated for seven time sequences. In particular, two component video sources (e.g., A and B) may be transcoded into a composite video at a node (e.g., C). Both video sources A and B (e.g., endpoint devices 1 and 2) generally use 2 reference frames. The node C (e.g., MCU device 9) may use 2+2=4 reference frames.

At a time 1: Source A generally sends a frame 260 to the node C. The frame 260 may be used as a reference frame in the source A. The source A may have a frame list containing the frame 260. The node C may transcode the frame 260 into a composite frame 480. The frame 480 may be used as a reference frame in the node C. The node C may have a frame list containing the frame 480.

At a time 2: Source B may send a frame 370 to the node C. The frame 370 may be used as a reference frame in the source B. The source B may have a frame list containing the frame 370. The node C may transcode the frame 370 into a composite frame 481. The frame 481 may be used as a reference frame in the node C. The frame list of node C generally contains the frames 481 and 480.

At a time 3: Source A may send a frame 261 to the node C. The frame 261 may be used as a reference frame in the source A. The frame list of the source A generally contains the frames 261 and 260. The node C may transcode the frame 261 into a composite frame 482. The frame 482 may be used as a reference frame in the node C. The frame list of node C generally contains the frames 482, 481 and 480.

At a time 4: Source B generally sends a frame 371 to node C. The frame 371 may be used as a reference frame in the source B. The source B may have a frame list containing the frames 371 and 370. The node C may transcode the frame 371 into a composite frame 483. The frame 483 may be used as a reference frame in the node C. The frame list in the node C may contain the frames 483, 482, 481 and 480.

At a time 5: Source A may send a frame 262 to the node C. The frame 262 may be used as a reference frame in the source A. The frame list of the source A may contain the frames 262 and 261. The frame 260 may have been removed from the list as the oldest of the stored frames in the source A. The node C generally transcode the frame 262 into a composite frame 484. The frame 484 may be used as a reference frame in the node C. The frame list of node C may contain the frames 484, 483, 482 and 481. The frame 480 may have been removed from the list as the oldest of the stored frames in the node C.

At a time 6: Source B may send a frame 372 to the node C. The frame 372 may be used as a reference frame in the source B. The frame list in the source B generally has the frames 372 and 371. The frame 370 may have been removed from the list as the oldest frame in the source B. The node C may transcode the frame 372 into a composite frame 485. The frame 485 may be used as a reference frame in the node C. The reference list of the node C may include the frames 485, 484, 483, and 482. The frame 480 may have been removed as the oldest frame in the node C.

At a time 7: Source B may send a frame 373 to the node C. The frame 373 may be used as a reference frame in the source B. The frame list of the source B generally contains the frames 373 and 372. The frame 371 may have been removed from the source B as the oldest frame. The node C may transcode the frame 373 into a composite frame 486. The frame 486 may be used as a reference frame in the node C. The frame 483 should be removed from the reference list in the node C, instead of the older frame 482, because the frame 483 generally corresponds to the frame 371 of the source B. The node C may thus have a frame list including the frames 486, 485, 484, and 482. Function ref_pic_list_reordering ( ) may be used to adjust the reference frame list.

For the transcoded frame to reference a correct reference frame, the reference index may be adjusted accordingly. For example, if the frame 262 from the source A refers to the frame 261, the frame 262 may use the reference index 0. The frame 261 may be transcoded to the frame 482 in the node C. The frame 262 may be transcoded to the frame 484 during the time sequence 5 using the reference frame list in the time sequence 4. The transcoded frame 261 may be listed as index 1 in the node C. During the transcoding, the reference index 0 may be replaced by 1. For component video that uses long term reference frames, the reference index may be handled in a similar way. Whenever the component source generates a long term reference frame, the composite video node may generate a corresponding long term reference frame. Whenever the component video source removes a long term reference frame, the composite video node generally removes a corresponding long term reference frame.

Consistent with the previous procedures, no Instantaneous Decoder Refresh (IDR) frame may be generated. Some endpoints devices 1-N may expect the first frame of the video signal OUT to be an IDR frame. The MCU device 9 may generate an IDR frame in the very beginning of the video. The IDR frame may be an all-black color frame or anything in the content as long as the IDR frame is not used as a reference frame.

Referring to FIG. 16, a second TABLE II of an example time sequence for conversion from two sources is shown. Although the MPCP system 100 generally transcodes one component frame at a time, the uncoded regions of the composite frames may acquire the content of component frames from other endpoints devices 1-N when the output frames are decoded by the receiving endpoint devices 1-N. The above fact may be useful in reducing the number of reference frames utilized at any give time.

For example, the first component frame to arrive at the node C (e.g., MCU device 9) may be the frame 260 from the source A. The frame 260 may be transcoded to the frame 480 by the node C. After the frame 480 is decoded by the endpoint devices 1-N, the decoded frame 480 generally contains the content of the frame 260 from the source A. The second source frame to arrive may be the frame 370 from the source B. The second frame 370 is generally transcoded to the frame 481 by the node C. After the frame 481 of the node C is decoded by the endpoint devices 1-N, the frame 481 generally contains the content of frame 260 of the source A as well as the content of the frame 370 of the source B. The reference list in the node C at the time step 2 may therefore list only the frame 481, instead of both frames 481 and 480. Thus, in one embodiment, the MPCP system 100 may use a smaller number of reference frames than the total number of reference frames from all of the participating endpoint devices 1-N.

Figure 17:
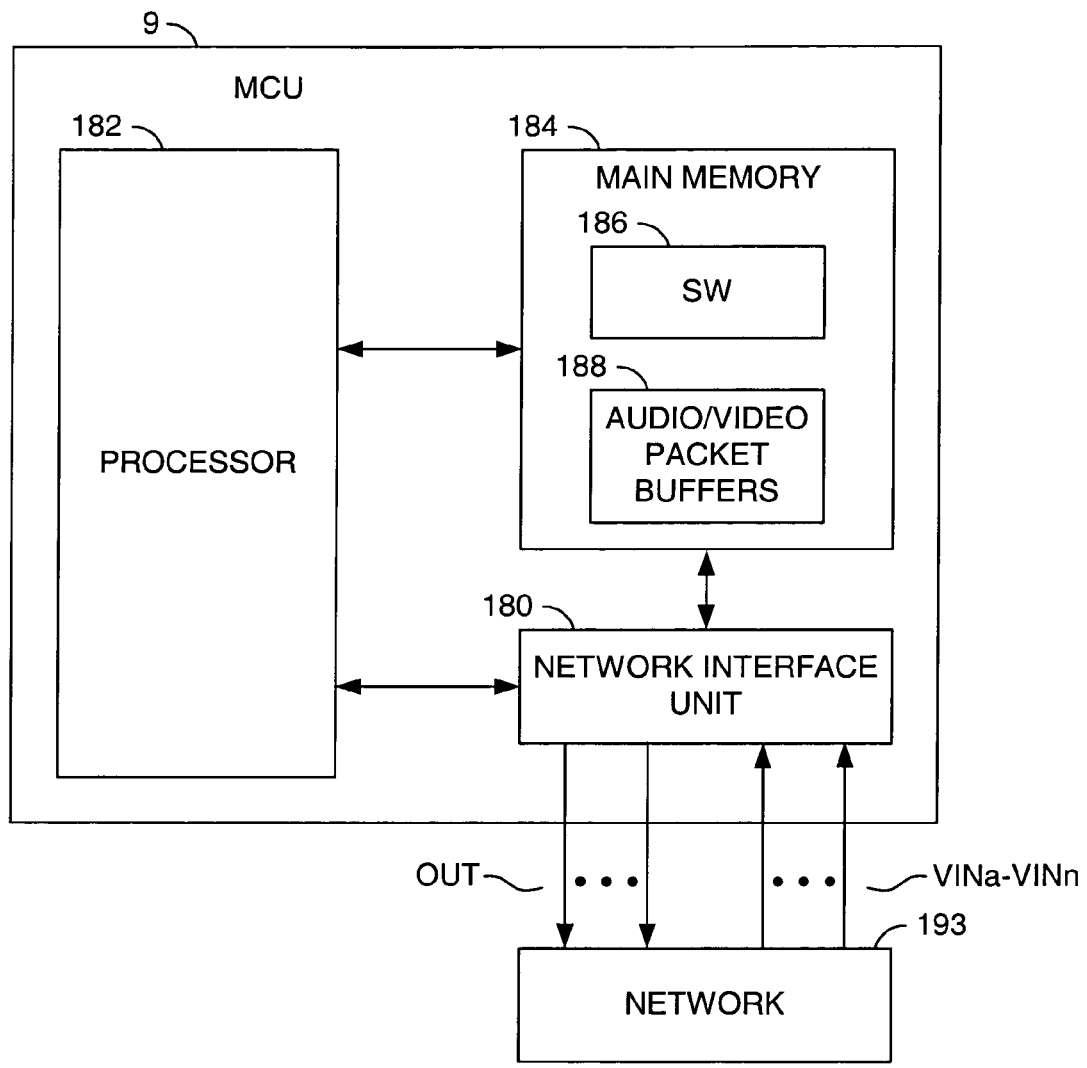
FIG. 17 is a block diagram of an example implementation of an MCU.

Referring to FIG. 17, a block diagram of an example implementation of an MCU 9 is shown. The MCU 9 generally comprises a network interface unit (or circuit) 180, a processor module (or circuit) 182 and a memory module (or circuit) 184. The memory module 184 generally comprises a software module (or program) 186 and an audio/video packet buffer block (or circuit) 188. The software 186 may be stored in the memory module 184 to be available to the processor module 182 for execution.

The packet buffers 188 may be operational to buffer coded information (audio and video) received in the component video streams VINa-VINn. The memory module 184 may also be operational to buffer coded information (audio and video) generated by the processor module 182 and presented as the composite video stream OUT. The packet buffers 188 may be relatively small compared with the video streams VINa-VINn and OUT. In particular, the packet buffers 188 may be sized to buffer as little as a single composite frame for the composite video stream OUT plus one or more component frames received from one or more of the component video signals VINa-VINn. In general, less than a complete frame for all of the component video signals VINa-VINn needs to be buffered. For example, frames are continuously received on a packet-by-packet basis at uncorrelated times from each of the video streams VINa-VINn. As soon as the last packet is received for a particular frame in any of the video streams VINa-VINn, the received frame is processed and transmitted as a frame of the composite video stream OUT. While one frame of one of the video streams VINa-VINn is accumulating all the packets, packets from the other video streams VINa-VINn are also accumulating. For example, a particular implementation may have ten input video streams VINa-VINn. Each frame in each of the video streams VINa-VINn may have ten packets. 9 of 10 packets for a frame from each the video streams VINa-VINn may be received before the 10th packet for any one of the frames is received. In such a case, 91 packets would be buffered at the moment the $10^{th}$ packet is received. Additional buffering may be implemented to compensate for processing (and network) latency. While ten input video streams VINa-VINn and frames with 10 packets have been described, the particular number of packets per frame varies in response to network conditions and/or configurations. The particular number of input video streams VINa-VINn may be varied to meet the design criteria of a particular implementation.

In applications where the MCU 9 may generate (i) a composite frame having two or more pictures simultaneously or (ii) two or more unique composite frames, the packet buffers 188 may be sized to store more frames. In general, the packet buffers 188 do not buffer multiple frames for any of the component video signals VINa-VINn since the slices of the composite video stream OUT are generated as each slice of the component video signals VINa-VINn are received.

The processor module 182 may be operational to convert the component video streams VINa-VINn into the composite video stream OUT. The processor 182 may be implemented as multiple processor modules, or may be implemented as a single processor. The processor 182 may include additional peripheral components not specifically shown.

The conversion of the component video streams VINa-VINn into the composite video stream OUT (or streams OUTa-OUTn) is generally controlled by the software module 186. The software module 186 may be stored in the main memory module 184 and executed by the processor module 182.

The main memory module 184 may be configured as a random access memory in communication with the processor module 182. Other memory technologies may be implemented to meet the criteria of a particular application. The main memory module 184 may provide one or more levels of cache and/or virtual memory capabilities. The main memory module 184 may include a mass storage capability, such as a magnetic hard drive storage, tape storage and/or optical disk storage.

Figure 18:
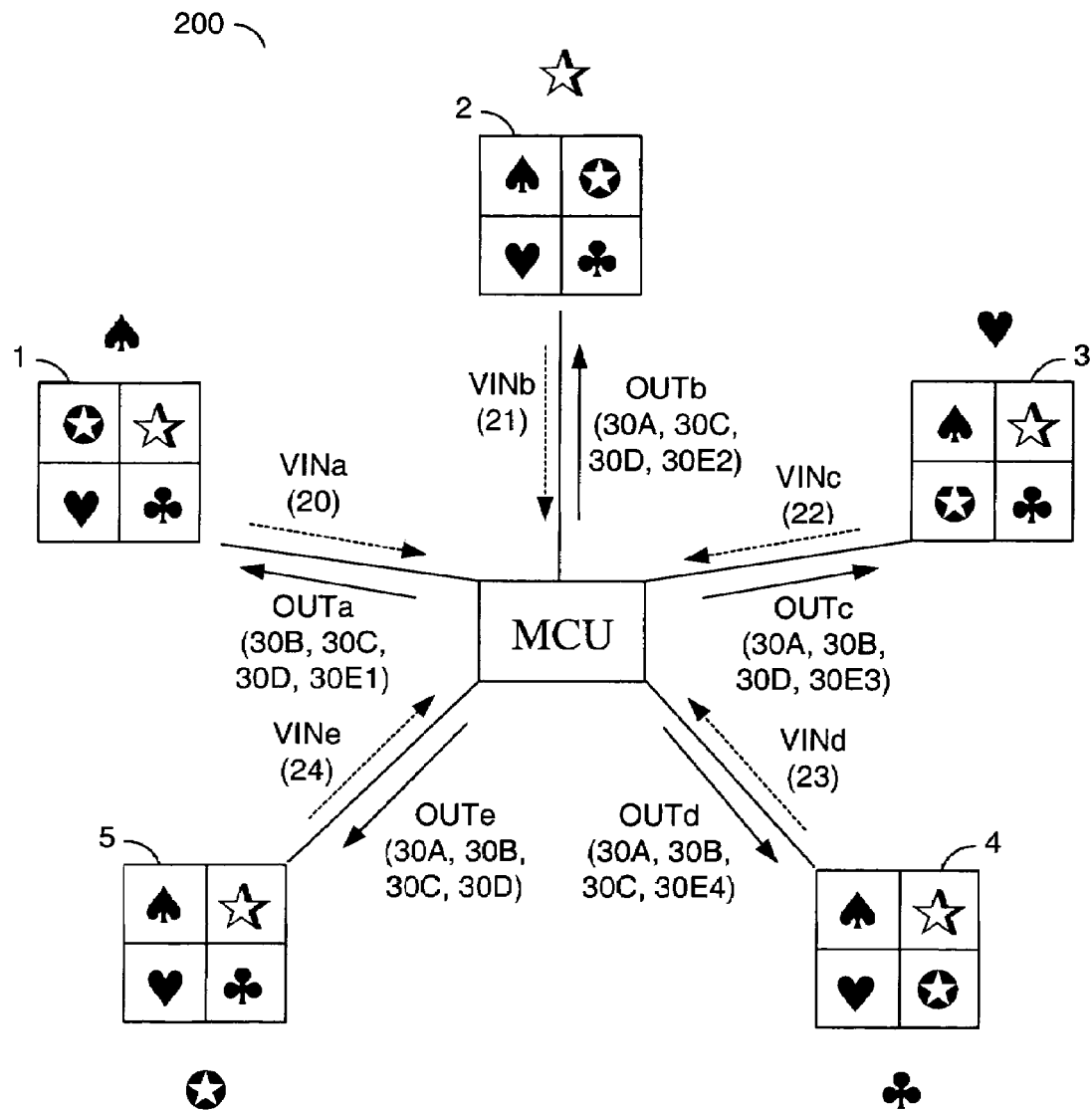
FIG. 18 is a block diagram of an example implementation of a second MPCP system.

Referring to FIG. 18, a block diagram of an example implementation of an MPCP system 200 is shown. The MPCP system 200 generally comprises the endpoint devices 1-5 and an MCU 9. The MCU 9 may be configured to generate multiple unique composite video signals (or streams) (e.g., OUTa-OUTe) from the component video signals VINa-VINe.

Each of the composite video streams OUTa-OUTe may include pictures from only some (e.g., 4) of the endpoint devices 1-5. For example, each composite video stream OUTa-OUTe may include a picture from each of the endpoint devices 1-5 except for the picture generated locally. Therefore, the composite video stream OUTa may contain pictures from the endpoint devices 2-5, but not from the endpoint device 1. The composite video stream OUTb may contain pictures from the endpoint devices 1 and 3-5, but not from the endpoint device 2, and so on.

Figure 19:
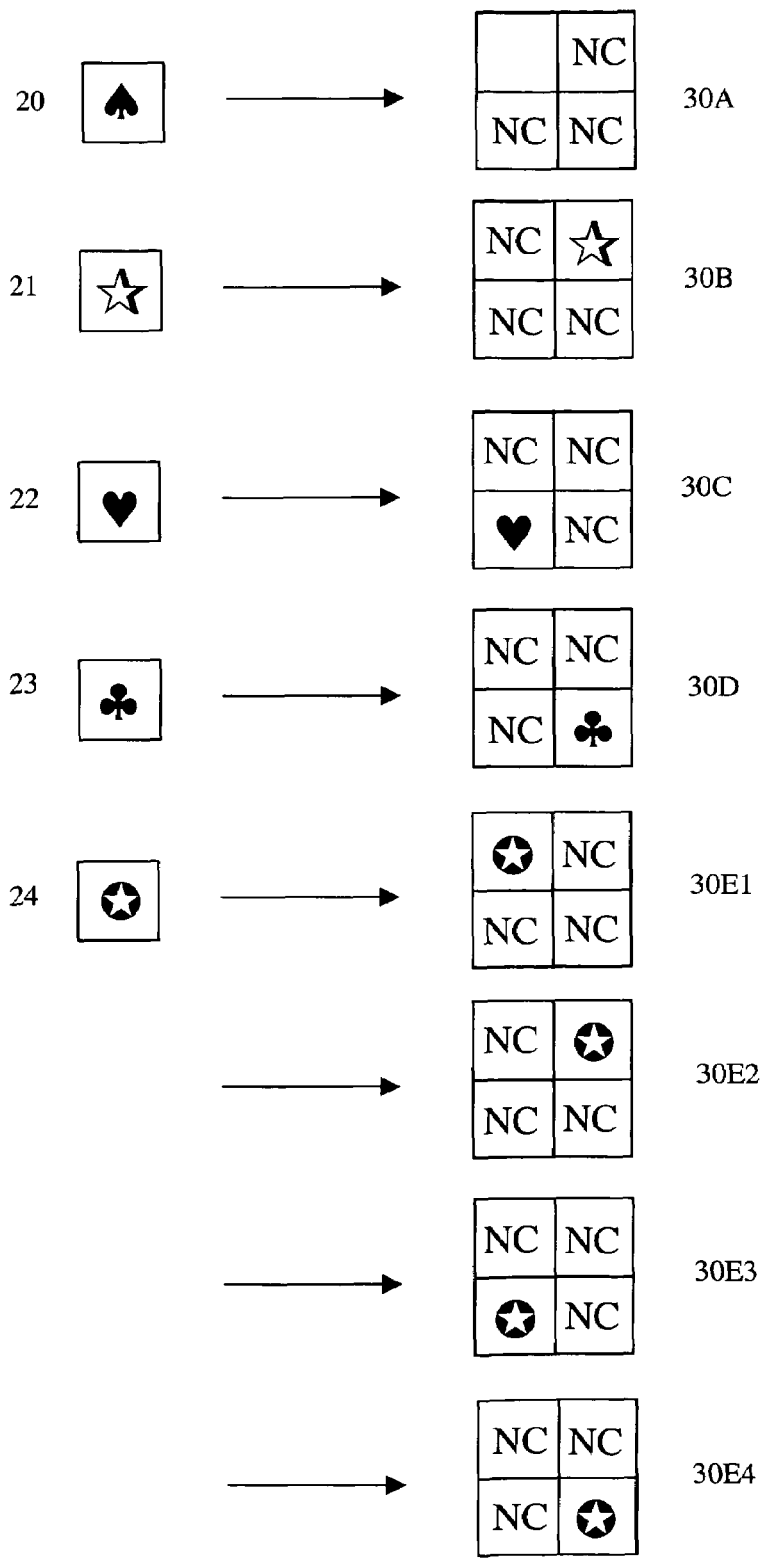
FIG. 19 is a diagram of an example allocation of component pictures within composite video streams.

Referring to FIG. 19, a diagram of an example allocation of component pictures within the composite video streams OUTa-OUTe is shown. The component video streams OUTa-OUTe may carry respective pictures 20-24. The composite video stream OUTa (FIG. 18) may return the pictures 21, 22, 23 and 24 in frames 30B, 30C, 30D and 30E1. The composite video stream OUTb may return the pictures 30A, 30C, 30D and 30E2. The composite video stream OUTc may return the pictures 30A, 30B, 30D and 30E3. The composite video stream OUTd may return the pictures 30A, 30B, 30C and 30E4. The composite video stream OUTe may return the pictures 30A, 30B, 30C and 30D.

The composite frames 30A-30E4 generally show the placement of the component pictures 20-24 within a frame. Since more component pictures 20-24 generally exist than positions in the composite frames 30A-30E4, one or more of the component pictures 20-24 may be located at different positions in different composite video streams OUTa-OUTe. In the example illustrated, the component picture 24 may be placed in a different position in each of the composite frames 30E1-30E4. Each of the composite frames 30E1-30E4 may be transmitted in a respective one of the composite video streams OUTa-OUTe. Placement of the pictures 20-24 in different positions within the composite frames may be established during the call set-up initialization.

The H.264 standard allows pictures to be divided into multiple slice groups. Each slice group comprises one or more slices. The macroblocks of each slice are coded in raster-scan order. Using the foreground/background slice group structure, for example, a picture may be partitioned into N-1 foreground groups and one background group. The foreground groups may each be defined as a rectangular region generally specified by an upper left and a lower right position. The background slice group comprises all of the macroblocks not contained in any other slice group. The foreground slice groups may overlap with each other. When the foreground slice groups overlap, macroblocks in the region of overlap are allocated to the slice group with the lower (or lowest) group number.

When the video streams in the MPCP system 100 are compliant with the H.264 standard, the component pictures received by the MCU 9 generally comprise either (i) a single slice group or (ii) multiple slice groups. The following lists several possible ways that the MCU may transcode a single component picture into a single composite picture, in accordance with a preferred embodiment of the invention.

Figure 20:
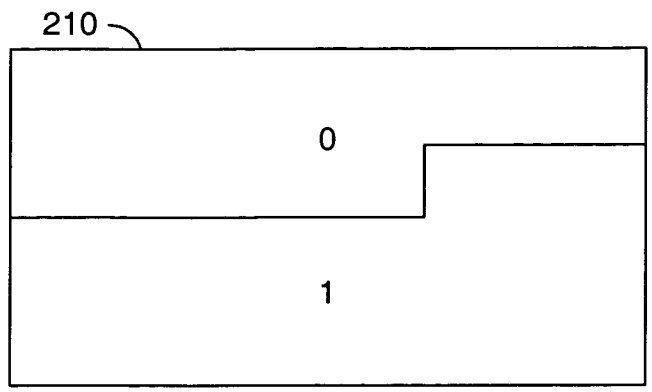
FIGS. 20-22 are diagrams illustrating a conversion of a regular single slice component picture into a regular single slice composite frame.
Figure 21:
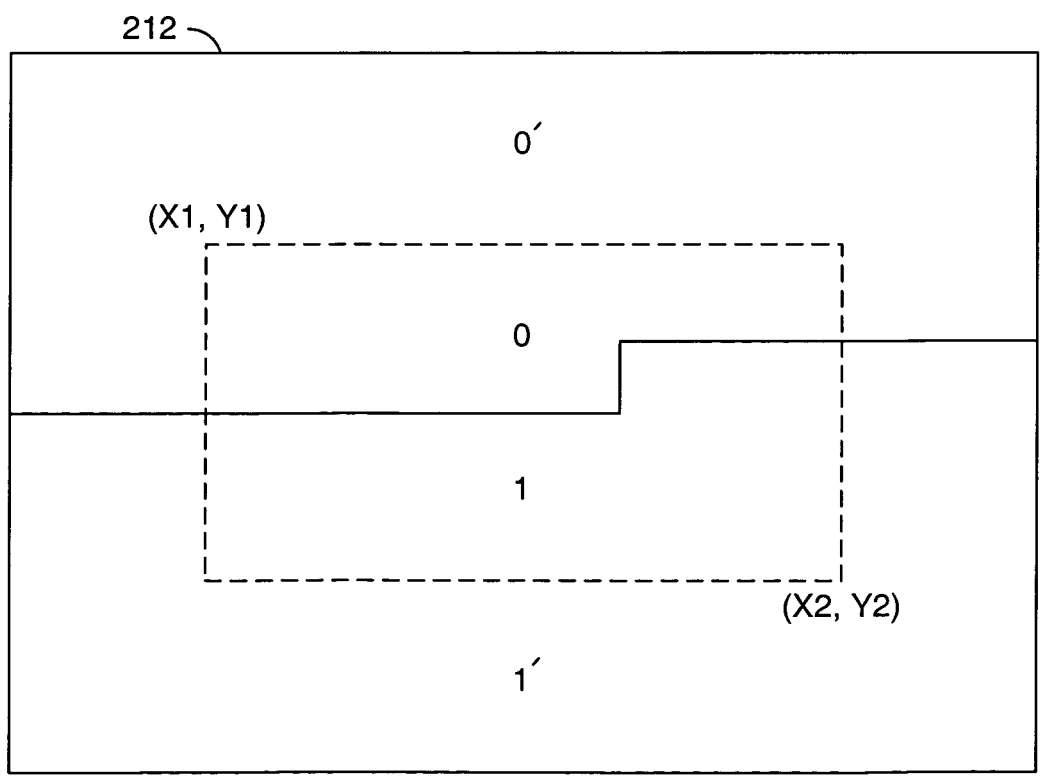
Figure 22:
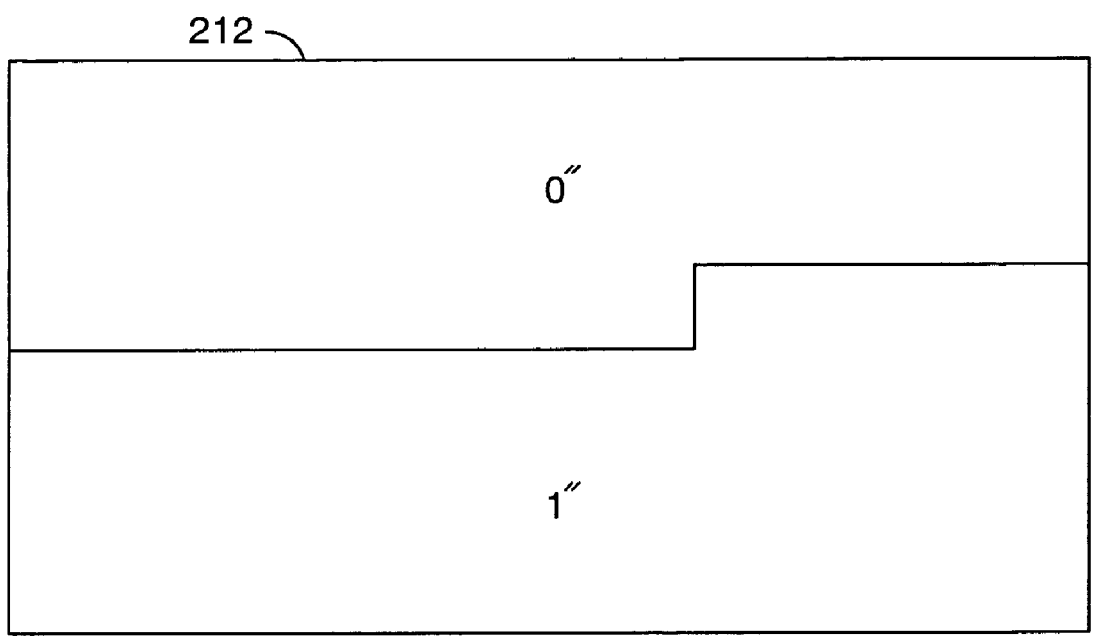

1. Single slice group to single slice group. Referring to FIGS. 20-22, the MPCP system 100 may transcode a single slice group component picture into a single slice group composite picture. The composite picture may have the same number of slices as the component picture (e.g., two slices in the present example). The MPCP system 100 generally relocates the content of the component picture (e.g., the frame 210) to a rectangle defined by two points (e.g., (X1, Y1) and (X2, Y2)) in the composite picture (e.g., frame 212). If either the slice 0 or the slice 1 is an I-slice, the MPCP system 100 converts the I-slice into a P-slice with Intra macroblocks. The converted P-slice may then be combined with the skip runs to form a new combined slice. In FIG. 21, the macroblocks in area 0 (e.g., the content of the slice 0) may be combined with the macroblocks in area 0' (e.g., all of the supplementary skip runs) to form a composite P-slice 0''. the macroblocks in area 1 (e.g., the content of the slice 1) may be combined with the macroblocks in area 1' (e.g., all of the skip runs) to form a composite P-slice 1''. FIG. 22 generally shows the slices 0'' and 1'' within the final composite picture.

2. Single slice group to multiple slice group. Alternatively, the MPCP system 100 may transcode a single-slice-group component picture, such as frame 210 in FIG. 20, into a multiple-slice-group composite picture. The MPCP system 100 generally inserts the content of the component picture into a foreground slice group defined at a desired location in the composite picture. The remainder of the composite picture (e.g., all of the skipped macroblocks) is represented by a single skip run in a background slice group. The foreground slice group generally comprises the same number of slices as the original component picture. The background slice group generally comprises a single skip run of unencoded macroblocks. With such an implementation, conversion of slice types is not necessary. In particular, the component picture slice(s) retain the original slice type(s) upon insertion into the composite picture. Also, with such an implementation, the MPCP system 100 does not need to insert skip runs between the rows of coded macroblocks in the component picture.

Figure 23:
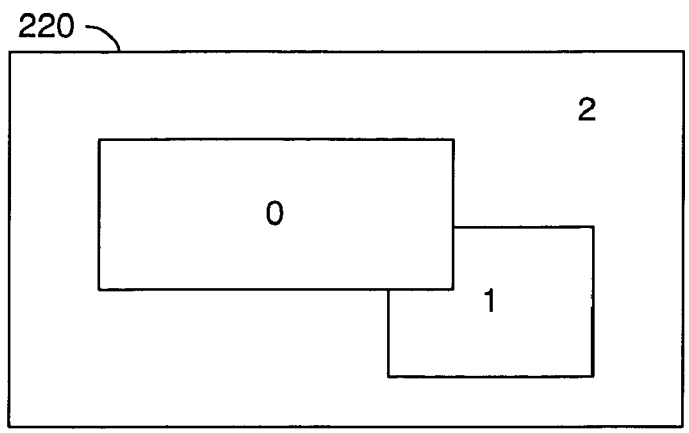
FIGS. 23-25 are diagrams illustrating a conversion of a multiple-slice group component picture into a multiple-slice group composite frame.
Figure 24:
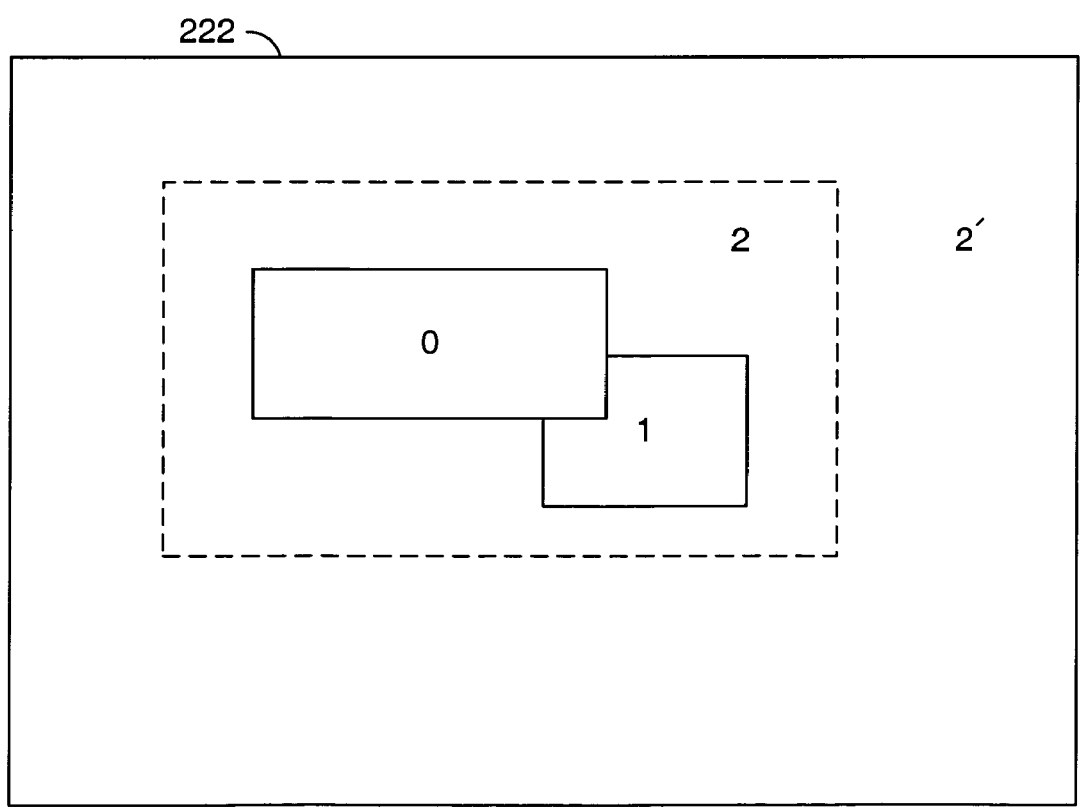
Figure 25:
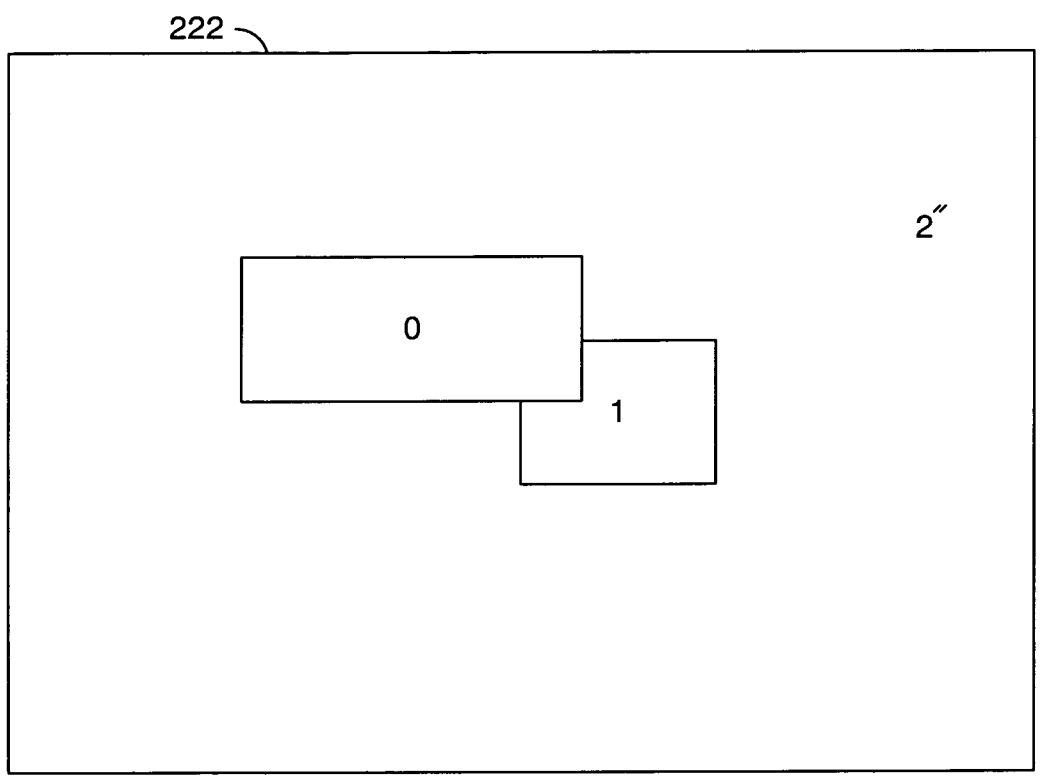

3. Multiple slice group to multiple slice group. Referring to FIGS. 23-25, diagrams illustrating a conversion of a multiple slice group component picture into a multiple slice group composite frame are shown. FIG. 21 illustrates a picture comprising two foreground slice groups (e.g., slice group 0 and slice group 1) and a background slice group (e.g., slice group 2). In FIG. 22, the MPCP system 100 generally inserts slice group 0 and slice group 1 at desired locations in a composite picture 222. If the background of the component picture (e.g., group 2) contains any I-slices, the MPCP system 100 converts the I-slices into P-slices with Intra macroblocks. The slice(s) from slice group 2 are then combined with all of the skip runs in area 2' to form a new background slice group 2''. FIG. 23 generally shows the slice group 0, the slice group 1 and the new slice group 2'' in the composite picture 222. Slices in the slice group 0 and the slice group 1 retain the original slice types during the transcoding process.

In another example, the MPCP system 100 may also combine two or more component pictures into a single composite picture. In particular, the MPCP system 100 may combine two or more single-slice-group component pictures into a multiple-slice-group composite picture. In such an implementation, each component picture would be inserted as a slice group at a desired location in the composite picture. The background slice group would then comprise a skip run representing the remaining, unencoded area of the composite picture.

The MPCP system 100 may also transcode two or more multiple slice group component pictures into a multiple slice group composite picture. For example, consider the case of component pictures with foreground/background slice groups. In this case, the foreground groups of all of the component pictures may simply be inserted as foreground slice groups at desired locations in the composite picture. The background slice groups may be combined with supplementary skip runs to form a new background group. However, since only P-slices may be combined with skip runs, any I-slices in any of the original background slice groups need to be converted into P-slices with Intra macroblocks. In addition, the slices from the component background groups will not generally constitute proper slices in the composite picture background slice group, since slices by definition comprise macroblocks in raster scan order. The relocated slices, when juxtaposed with other relocated slices, will in general no longer possess such a raster scan order. In general, such an implementation may combine some or all of these former slices to create new, proper slices. With such an implementation, proper quantizers may be selected for each combined slice to avoid a loss in fidelity. In one implementation, the greatest common divisor (GCD) of all the quantizers of the slices to be combined may be selected as the quantizer for the combined slice.

The function performed by the functional block diagrams of FIGS. 5 and 13 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMS, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for generating a video output signal, comprising the steps of:
   (A) receiving a plurality of input video signals from each of a plurality of participants, each of said input video signals having a plurality of input frames, each of said input frames having a source slice carrying an image, each of said input frames being encoded using a reference frame at an encoding time; and
   (B) generating said video output signal for transmission to said participants, said video output signal comprising a plurality of output frames, wherein (i) a first of said output frames has at least a first slice having (a) a first coded portion carrying said image from a first of said participants and (b) a first unencoded portion for said image from a second of said participants, (ii) a second of said output frames has at least a second slice having (a) a second coded portion carrying said image from said second participant and (b) a second unencoded portion for said image from said first participant and (iii) said frames of said video output signal are generated as soon as one of said frames of said video input signal are received.

2. The method according to claim 1, wherein a third of said output frames has a third slice having (a) a third coded portion carrying said images from said first participant and said second participant and (b) a third unencoded portion for said image from a third of said participants.

3. The method according to claim 1, further comprising the step of:
   prohibiting unrestricted motion vectors in said video input signals through a handshake process.

4. The method according to claim 1, wherein said first unencoded portion indicate that a previously received coded portion from said second participant should be repeated.

5. The method according to claim 1, wherein output frames are generated without decoding said input frames.

6. The method according to claim 1, further comprising the step of:
   changing a size of said image from said first participant in said video output signal in response to said first participant being an active speaker.

7. The method according to claim 1, wherein said video output signal is compliant with at least one of an International Organization for Standardization/International Electrotechnical Commission 14496-10 standard and an International Telecommunication Union-Telecommunications Revised Recommendation H.264.

8. A method for generating a video output signal, comprising the steps of:
   (A) receiving a plurality of input video signals from each of a plurality of source devices, each of said input video signals having a plurality of input frames, each of said input frames having a source slice carrying an image, each of said input frames being encoded using a subset of a plurality of reference frames at an encoding time; and
   (B) generating said video output signal for transmission to a video on demand display, said video output signal comprising a plurality of output frames, wherein (i) a first of said output frames has at least a first slice having (a) a first coded portion carrying said image from a first of said source devices and (b) a first unencoded portion for said image from a second of said source devices, (ii) a second of said output frames has at least a second slice having (a) a second coded portion carrying said image from said second source device and (b) a second unencoded portion for said image from said first source device and (iii) said frames of said video output signal are generated as soon as one of said frames of said video input signal are received.

9. The method according to claim 8, wherein a third of said output frames has a third slice having (a) a third coded portion carrying said images from said first source device and said second source device and (b) a third unencoded portion for said image from a third of said source device.

10. The method according to claim 9, wherein said third unencoded portion comprises a non-rectangular shape.

11. The method according to claim 8, wherein at least one of said images has a rectangular shape.

12. The method according to claim 8, further comprising the step of:
generating said reference frames from decoded versions of said output frames.

13. The method according to claim 11, further comprising the step of:
generating a reference picture list storing a plurality of reference picture numbers each pointing to a portion of one of said reference frames for use in encoding said input frames.

14. A method for generating a video output signal, comprising the steps of:
(A) receiving a plurality of input video signals from a plurality of participants, each of said input video signals having a plurality of input frames, each of said input frames having a source slice carrying an image; and
(B) generating said video output signal for transmission to said participants, said video output signal comprising a plurality of output frames, wherein (i) a first of said output frames has (a) a first foreground slice carrying said image from a first of said participants and (b) a first background slice designated as unencoded, (ii) a second of said output frames has (a) a second foreground slice carrying said image from said second participant and (b) a second background slice designated as unencoded and (iii) said frames of said video output signal are generated as soon as one of said frames of said video input signal are received.

15. The method according to claim 14, wherein said first foreground slice further carries said image from a third of said participants.

16. The method according to claim 14, wherein said first output frame has a third foreground slice carrying said image from a third of said participants.

17. The method according to claim 14, further comprising the step of:
limiting each of said participants to one respective reference frame at a time through a handshake process.

18. The method according to claim 14, further comprising the step of:
limiting said participants to a maximum number of reference frames at a time through a handshake process.

19. The method according to claim 14, further comprising the step of:
prohibiting unrestricted motion vectors in said video input signals through a handshake process.

20. A system comprising:
a plurality of endpoint devices each configured to (i) generate an input video signal, each of said input video signals having a plurality of input frames, each of said input frames having a source slice carrying an image, and (ii) display an output video signal; and
a control unit configured to (A) perform a handshake process with said endpoint devices, (B) receive said video input signals and (C) generate said video output signal, said video output signal comprising a plurality of output frames, wherein (i) a first of said output frames has at least a first slice having (a) a first coded portion carrying said image from a first of said endpoint devices and (b) a first unencoded portion for said image from a second of said endpoint devices and (ii) a second of said output frames has at least a second slice having (a) a second coded portion carrying said image from said second endpoint device and (b) a second unencoded portion for said image from said first endpoint device.

* * * * *